United States Patent
Schmitt et al.

(10) Patent No.: US 10,331,452 B2
(45) Date of Patent: Jun. 25, 2019

(54) TRACKING MODE OF A PROCESSING DEVICE IN INSTRUCTION TRACING SYSTEMS

(71) Applicant: Intel Corporation, Santa Clara, CA (US)

(72) Inventors: Thilo Schmitt, Biberach/Riß (DE); Peter Lachner, Heroldstatt (DE); Beeman Strong, Portland, OR (US); Ofer Levy, Atlit (IL); Thomas Toll, Porltand, OR (US); Matthew Merten, Hillsboro, OR (US); Tong Li, Portland, OR (US); Ravi Rajwar, Portland, OR (US); Konrad Lai, Vancouver, WA (US)

(73) Assignee: Intel Corporation, Santa Clara, CA (US)

( * ) Notice: Subject to any disclaimer, the term of this patent is extended or adjusted under 35 U.S.C. 154(b) by 851 days.

(21) Appl. No.: 14/126,313

(22) PCT Filed: Jun. 27, 2013

(86) PCT No.: PCT/US2013/048089
§ 371 (c)(1),
(2) Date: Dec. 13, 2013

(87) PCT Pub. No.: WO2014/209312
PCT Pub. Date: Dec. 31, 2014

(65) Prior Publication Data
US 2015/0006717 A1    Jan. 1, 2015

(51) Int. Cl.
G06F 9/30        (2018.01)
G06F 11/36       (2006.01)

(52) U.S. Cl.
CPC ...... *G06F 9/30189* (2013.01); *G06F 11/3636* (2013.01)

(58) Field of Classification Search
USPC ......................................................... 709/224
See application file for complete search history.

(56) References Cited

U.S. PATENT DOCUMENTS

2004/0024995 A1 * 2/2004 Swaine ................... G06F 11/25
                                                            712/227
2004/0133388 A1    7/2004 Swoboda
(Continued)

FOREIGN PATENT DOCUMENTS

EP    1918816 A2    5/2008
RU    2429525 C2    9/2011

OTHER PUBLICATIONS

International Search Report and Written Opinion received for PCT Patent Application No. PCT/US2013/048089 dated Mar. 27, 2014, 9 pages.

(Continued)

*Primary Examiner* — Hermon Asres
(74) *Attorney, Agent, or Firm* — Lowenstein Sandler LLP

(57) ABSTRACT

In accordance with embodiments disclosed herein, there is provided systems and methods for tracking the mode of processing devices in an instruction tracing system. The method may include receiving an indication of a change in a current execution mode of the processing device. The method may also include determining that the current execution mode of the received indication is different than a value of an execution mode of a first execution mode (EM) packet previously-generated by the IT module. The method may also include generating, based on the determining that the current execution mode is different, a second EM packet that provides a value of the current execution mode of the processing device to indicate the change in the execution mode for an instruction in a trace generated by the IT module. The method may further include generating transactional memory (TMX) packets having n bit mode pattern (Continued)

in the packet log. The n is at least two and the n bit mode indicates transaction status of the TMX operation.

16 Claims, 17 Drawing Sheets

(56) References Cited

U.S. PATENT DOCUMENTS

| | | | |
|---|---|---|---|
| 2005/0060521 A1* | 3/2005 | Wang | G06F 11/3636 712/227 |
| 2005/0114845 A1 | 5/2005 | Devor et al. | |
| 2006/0259823 A1 | 11/2006 | Sohm et al. | |
| 2008/0162886 A1* | 7/2008 | Saha | G06F 9/3004 712/214 |
| 2009/0132796 A1 | 5/2009 | Snyder et al. | |
| 2010/0153784 A1* | 6/2010 | Inoue | G06F 11/0721 714/38.13 |
| 2010/0169579 A1* | 7/2010 | Sheaffer | G06F 12/084 711/141 |
| 2010/0235686 A1 | 9/2010 | Sato et al. | |
| 2011/0314342 A1 | 12/2011 | Gilkerson et al. | |
| 2012/0042212 A1* | 2/2012 | Laurenti | G06F 11/3466 714/45 |
| 2014/0006698 A1* | 1/2014 | Chappell | G06F 12/0842 711/105 |

OTHER PUBLICATIONS

ARM: "CoreSight ETM R4Revision: r2p1—Technical Reference Manual", ARM DDI 0367D, ID072915, 2011, 106 pages.

European Search Report for EP 13887960.6 dated Mar. 24, 2017, 8 pages.

Chinese Office Action dated Nov. 17, 2017, on application No. 201380076979.4.

* cited by examiner

| IT Packets 115 | | Execution flow 116 |
|---|---|---|
| Boundary Packet | 120 | Enable Tracing in 32-bit mode |
| ...state packets... | 121 | |
| EM Packet (Value=32) | 122 | |
| EMIP | 123 | |
| ... state packets ... | 124 | |
| State End Packet | 125 | |
| ... event packets ... | 126 | ... |
| EM Packet (Value=64) | 127 | Execution mode changes to 64-bit |
| EMIP | 128 | |
| ... event packets ... | 129 | ... |
| Boundary Packet | 130 | Periodic Sync Point |
| ...state packets... | 131 | |
| EM Packet (Value=64) | 132 | |
| EMIP | 133 | |
| ... state packets ... | 134 | |
| State End Packet | 135 | |

FIG. 1B

| IT Packets 115 | | Execution flow 118 |
|---|---|---|
| Boundary Packet | 140 | Enable Tracing, not in a transaction |
| ...state packets... | 141 | |
| TMX Packet (InTX=0, Abort=0) | 142 | |
| STMXIP | 143 | |
| ... state packets ... | 144 | |
| State End Packet | 145 | |
| ... event packets ... | 146 | ... |
| TMXB Packet (InTX=1, Abort=0) | 147 | Transaction begins |
| STMXIP | 148 | |
| ... event packets ... | 149 | ... |
| TMXA Packet (InTX=0, Abort=1) | 150 | Transaction aborts |
| STMXIP | 151 | |
| TTMXIP | 152 | |
| ... event packets ... | 153 | ... |
| Boundary Packet | 154 | Periodic Sync Point |
| ...state packets... | 155 | |
| TMX Packet (InTX=0, Abort=0) | 156 | |
| STMXIP | 157 | |
| ... state packets ... | 158 | |
| State End Packet | 159 | |

TRACKING MODE OF A PROCESSING DEVICE IN INSTRUCTION TRACING SYSTEMS

TECHNICAL FIELD

The embodiments of the disclosure relate generally to processing devices and, more specifically, relate to tracking mode of processing devices in an instruction tracing system.

BACKGROUND

An instruction tracing system (ITS) is a tracing capability, which provides a software execution control flow trace. The trace output is in the form of packets of variable sizes. A decoder may use the packets, along with the associated instruction bytes, to reconstruct the execution flow of the software that was traced.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 1B illustrates a table of examples of instruction sequence executed by the ITS and instruction tracing (IT) packets generated by the ITS to track execution mode in the instruction trace.

FIG. 1C illustrates a table of examples of instruction sequence executed by the ITS and IT packets generated by the ITS to track transactional memory execution in the instruction trace.

DETAILED DESCRIPTION

Figure 1A:
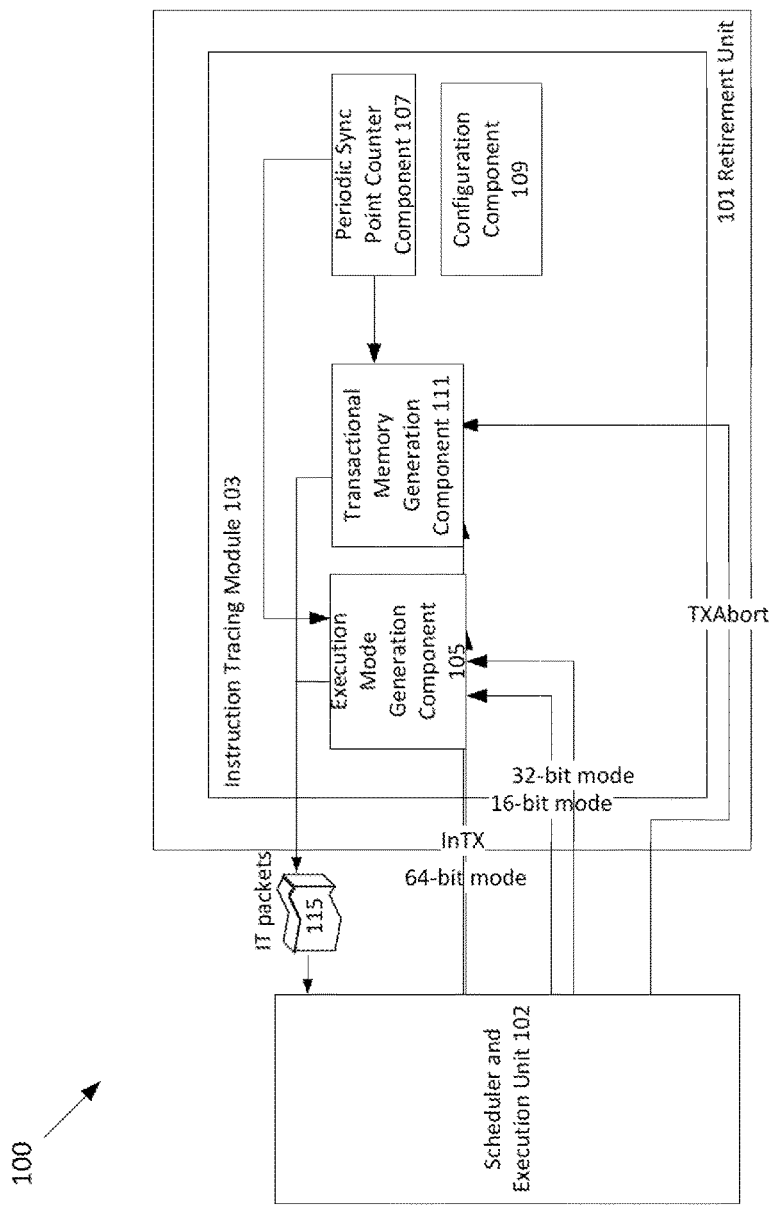
FIG. 1A illustrates an exemplary instruction tracing system (ITS) architecture of a processing device in accordance with which embodiments may operate.

Disclosed herein are embodiments for tracking mode of processing devices in an instruction tracing (IT) system. The mode tracking provides information, which helps debug executing software during instruction trace. In one embodiment, the information includes an indication of an event in the software that changed the execution mode of the processing device, including indication of the changed mode. In another embodiment, the information includes change in status of the transactional memory operation of the processing device.

IT packets of the IT system indicate a control flow of software executed by the processing device. As such, the IT packets may reveal resolution information for all branches and events traced, such that, when combined with the source instruction information, the software control flow can be reproduced. In order to track execution mode of the IT packets, the decoder should know an execution mode status for every instruction in the trace. The execution mode dictates how instruction bytes are interpreted by the processor, and can be changed by software at any time. Therefore, an awareness of the execution mode allows the decoder to properly interpret the instruction bytes from the software binaries. By keeping track of the processor's execution mode for each instruction, the decoder can accurately disassemble the instruction bytes to produce the same instructions that were executed by the processor, in order to reproduce the precise control flow.

In one embodiment, an IT module is provided to generate an execution mode (EM) packet represented by a two-bit pattern in a packet in the output log generated by the IT module. The EM packet provides an indication of the current execution mode of the processing device, and may be generated any time the execution mode changes. The EM packet would then indicate the new processor execution mode value.

With respect to the EM packets, the IT module may leverage a periodic sync point counter component of the processor to determine when to output EM packets, which provide the current execution mode of the processor. In one embodiment, the EM packets indicate an event in the software, which changes the execution mode of the processor, and further provides an indication of the changed mode. In one embodiment, the IT module may include an execution mode generation component that generates EM packets having the two bit pattern. The EM packet may provide an indication of a change in processor execution mode for an instruction tracked by the IT module. For example, different combinations of the bits in the two-bit pattern represent the different execution modes of the processor. In one embodiment, the execution mode generation component also generates an execution mode instruction pointer (EMIP) packet along with the EM packet. The EMIP packet includes the instruction pointer (IP) of a first instruction that executes in the changed execution mode associated with the EM packet. In one embodiment, the IP provides an execution address in the beginning of the instruction trace.

In order to accurately decode a trace, an IT decoder that receives the IT output log should know the execution mode for every instruction in the trace. Thus, in order to accurately decode instructions from the static binary, the IT decoder needs to know the initial mode and initial instruction pointer (IP) that corresponds to the beginning of the trace log. The decoder then proceeds to "walk" the binary image, decoding instructions, and determining their outcomes from the IT log. When the software executes a mode changing operation, the changed mode should be communicated to the IT decoder. After the mode change, the processor begins applying the changed mode information to the process of decoding instructions in the binary stored in the processor, and likewise, the decoder must also apply the mode information to the decoding of instructions stored in the static binary. If the processor and decoder become out-of-sync with each other with respect to mode information, the processor and decoder, may interpret instruction bytes differently, and therefore execute and walk different instructions, respectively. In such a case, the IT log generated by the processor is unlikely to be cohesive with interpretation of instruction bytes performed by the decoder, likely leading to error and failure of the decoding process. Last, because it is sometimes desirable to begin decoding in the middle of an output log, the IT module may periodically insert a status indication of the mode and the IP into the output log to create additional viable decode start points.

As discussed above, the IT packets indicate the software control flow. These IT packets are used by the decoder to reconstruct the execution flow of the software that were traced. In order to avoid confusing the decoder by sending packets for instructions that do not actually commit their state, the packet generation takes place at "retire" time. This avoids generation of packets for speculative operations that may be dropped by the processing device, such as instructions executed down a mis-speculated path. With introduction of transactional memory (TMX) operation, instructions can now retire speculatively such that their results (register state, memory writes, etc.) are only committed at a later point. When in a transaction, instructions retire as normal, but the state is only committed when the transaction ends in a commit. If the transaction is aborted, all state changes made by the speculative instructions, including those that have retired, are rolled back. As such, it is beneficial to provide the IT decoder information on which instructions commit state and which do not commit state, and the TMX instructions associated with the states.

In one embodiment, the IT module may also generate transactional memory (TMX) packets represented by a two bit mode pattern in a packet in an output log generated by the IT module. One bit may indicate whether a TMX transaction is in progress, and hence instructions retiring (and the packets associated with those instructions) are speculative. In one embodiment, this bit would be set when the transaction begins, and cleared when it ends or commits. Another bit may indicate that an abort occurred, and hence all state modified by the speculative TMX instructions in the transaction should be rolled back.

In one embodiment of the invention, the IT module may also include a transactional memory generation component that generates transactional memory (TMX) packets based on the two bit mode pattern, which indicates the TMX beginning point and any status change points within the IT output log. In one embodiment, the status change point indicates that an abort state occurred in the TMX operation. The abort state indicates that the instructions between the TMX beginning point and the abort point do not commit their state. Previously, the decoder would not know that instructions executed speculatively, within a transaction, and, if the transaction were aborted, that the results should be rolled back. As such, without knowing the change in the status of the TMX operation, the decoder would misrepresent the processor execution flow and processor state updates. Moreover, the abort state in the TMX operation may cause transfer of control flow. As such, without any indication of the abort of the TMX operation, including the source and destination instruction pointers (IPs) of the abort event, the decoder would become out-of-sync with the real execution control flow, and thus the generated IT log packets would not be cohesive with where the decoder is tracking execution.

In another embodiment, the processor may eliminate the packets generated by the aborted and thus non-committed speculatively executed instructions. However, it may be difficult for the processor to buffer the output packets until the processor aborts or commits the TMX region of instructions. Alternatively, the processor may try to back up the write pointer into the trace output log, thus removing those packets from the trace log. But this might be difficult in cases of large TMX regions with many packets, where a system component is periodically archiving the output packet log to a non-volatile storage medium, and the beginning point of the aborted region has already been archived. Last, it may be valuable to a debugging agent to explore the execution flow in an aborted region to help identify the reasons for the abort.

Like with the EM packets, the decoder should need to determine the TMX state of the processor at the beginning of tracing. Should the decoder encounter a TMX aborting state, the decoder might be confused, had it not previously seen a TMX beginning state. In such a case, the decoder may not know what execution and processed packetized outcomes to discard due to the abort. Also like EM, TMX packets may be inserted into the output log as the TMX events occur during execution in the processor. And lastly, like EM, the IT module may insert TMX status information as part of the periodic sync points, to create additional decoder start points, which include all processor state, needed to decode the output log.

It should be noted that other types of processor mode information may be handled similarly, in that status packets are provided at the beginning of the trace and at periodic synchronization points within the output log, as well as event packets indicating changes in the mode inserted at the time of the event into the output log. Mode information may include information required for proper decode of the binary code, and may include information useful for characterizing behavior of various components. Such mode information includes, but not limited to, memory ordering rules, strict vs loose adherence to IEEE floating point rounding rules, pointer to the base of the page table, processor frequency, system frequency, code segment base address, data segment base address, pointer to the base of the virtual machine control structure, processor voltage, processor power state, system power state, component power down, etc.

In the following description, numerous specific details are set forth (for example, specific IT logic implementations, IT packet formats, hardware/firmware partitioning details, logic partitioning/integration details, processor configurations, micro-architectural details, sequences of operations, types and interrelationships of system components, and the like). However, it is understood that embodiments of the invention may be practiced without these specific details. In other instances, well-known circuits, structures and techniques have not been shown in detail in order not to obscure the understanding of this description.

FIG. 1A illustrates an exemplary architecture 100 of a processing device in accordance with which embodiments may operate including IT architecture that generates instruction trace (IT) packets 115. In one embodiment, the processing device is a central processing unit (CPU).

More particularly, a retirement unit 101 includes an IT module 103, which receives information from a scheduler and execution unit 102 and packetizes the information (e.g., the current execution mode value associated with instructions in the trace) to output in the IT packets 115, which are sent to the scheduler and execution unit 102. The IT module 103 may include an execution mode generation component (EMGC) 105, which receives current execution mode values from the scheduler and execution unit 102. As discussed above, the execution mode values may include, but are not limited to, 8-bit mode, 16-bit mode, 32-bit mode, 48-bit mode and 64-bit mode. In one embodiment, the EMGC 105 extracts the current execution mode values from the scheduler and execution unit 102. In other embodiments, the EMGC 105 receives the current execution mode values from the scheduler and execution engine 102 upon request. In further embodiments, the EMGC 105 automatically receives the current execution mode values from the scheduler and execution unit 102.

The IT module 103 may also include a periodic sync point counter component 107 coupled to the EMGC 105. The periodic sync point counter component 107 sends a command signal to the EMGC 105 to write an EM packet, as a periodic mode status update, to the IT output packet stream 115. As discussed above, the EM packet provides the current execution mode of the processor, including indication of any change in the execution mode of the processor. In one embodiment, the EMGC is implemented as a sequence of executed instructions or micro-operations (also called uops) that the machine executes to generate EM packets.

In one embodiment, the EM packet includes a two-bit pattern in a packet log, which indicates the current execution mode of the processor for the IT packets 115. The embodiments of the present invention are not limited to a two-bit pattern and the EM packet may include patterns having more than two-bits or less than two-bits depending on architecture implementation. In one embodiment, this two-bit pattern may reflect the values of architectural bits. For example, when the values of both the bits in the two-bit pattern are zero, this can indicate the value of the execution mode as a 16-bit mode. In another example, when the value of one of the bits in the two bit pattern is zero and the other bit is one, this can indicate the value of the execution mode as one of a 32-bit mode or a 64-bit mode, depending on the architecture of the processing device.

For example, the EMGC 105 may receive an indication of the 16-bit mode as the current execution mode value from the scheduler and execution unit 102, and then later receives an indication of the 32-bit mode as the current execution mode value from the scheduler and execution unit 102. Upon receipt of the 32 bit mode, the EMGC 105 recognizes the change in the current execution mode value and generates an EM packet, which provides the execution mode value change point for the associated IT packet 115.

The IT module 103 may also include a configuration component 109 coupled to the EMGC 105. The configuration component 109 allows the software to configure the frequency of periodic sync points as controlled by the Periodic Sync Pointer Counter Component 107, and may further allow the software to configure the inclusion/exclusion of specific EM packets in the IT packets 115.

The EMGC 105 also generates an execution mode instruction pointer (EMIP) packet that is associated with the EM packet in the IT packets 115. In one embodiment, the EMIP packet follows the associated EM packet. The EMIP packet includes the IP of a first instruction that executes in the changed executed mode.

Utilizing the received EM and EMIP packets, the decoder may know when the execution mode changes for an instruction in the trace. Also, the decoder may know precisely where in the binary code that the mode changes, in order to accurately disassemble the instruction bytes. As a result, the instruction flow of the trace matches the execution flow of the processor.

In one embodiment, the decoder may seek to know the execution mode at the beginning of the trace, such as before the first change in the mode execution. The EMGC 105 sends the EM packet in a series of state packets. The state packets provide current status information of the processing device. As such, the current execution mode in the EM packet is provided in the state packets. Because the decoder begins decoding at the state packet, it accurately decodes the state packets at the beginning of the trace. The inclusion of the series of state packets at periodic points in the output log creates additional points at which the decoder may begin decoding.

In one embodiment, the sequence of IT packets 115 in a packet log of the output stream may include, but is not limited to, a boundary packet followed by plurality of various state packets, which may include an EM packet and EMIP packet, followed by a state end packet. This sequence may repeat itself at another point in the packet log in the output stream. The boundary packet in the packet log is followed by a first byte of a packet, thus serving as the starting point for packet decode. In one embodiment, the state end packet provides an indication of the end of the state packets. Packets outside of a region of packets enclosed by a boundary packet and a state end packet are event packets that were inserted into the output log at the point of the mode change.

FIG. 1B illustrates a table of examples of IT packets 115 generated by the IT module 103 when tracing is enabled, during execution flow 116, for example. As shown, while the processor is executing the software sequence a packet log including the IT packets 115 are generated by the IT module 103. As an example, the IT packets 115 include boundary packet 120, which is followed by state packets 121, which are followed by an EM packet 122 having an execution mode of 32-bit. As such, tracing is enabled in 32-bit mode. The EM packet 122 is followed by an EMIP packet 123, which provides the IP of the 32-bit execution mode in the output log. The EMIP packet 123 is followed by another set of state packets 124, which are followed by a state end packet 125.

In the example, in the midst of control flow changes, a change in an execution mode may occur in the execution flow 116. This change in execution mode are represented in a set of event packets 126 in the output packet log 115, which causes to generate another EM packet 127 with a changed execution mode in the output packet log 115. In the example shown, in the execution flow, the execution mode changes from a 32-bit mode to a 64-bit mode. Also, the IP of the execution mode change is represented in the output log as the EMIP packet 128, which immediately follows the EM packet 127. The EMIP packet 128 is followed by another set of event packets 129.

In the example, the a periodic sync point is created in the execution flow 116, which generates another boundary packet 130, which is followed by a set of state packets 131, which are followed by an EM packet 132 having an execution mode of 64-bit As such, tracing is enabled in 64-bit mode. The EM packet 132 is followed by an EMIP packet 133, which provides the IP of the 64-bit execution mode in the output log. The EMIP packet is followed by another set of state packets 134, which is followed by a state end packet 135.

Referring back to FIG. 1A, as discussed above, the IT module 103 receives information from a scheduler and execution engine 102 and packetizes the information to output the IT packets 115. In one embodiment, the information includes the transaction status of the processor. Such TMX status includes, but is not limited to, Transaction Begin, Transaction Commit and Transaction Abort. The IT module 103 may include a transactional memory generation component (TMXGC) 111, which receives the TMX status from the scheduler and execution engine 102. In one embodiment, the TMXGC 111 extracts the TMX status from the scheduler and execution engine 102. In another embodiment, the TMXGC 111 receives the TMX status from the scheduler and execution engine 102 upon request. In further embodiments, the TMXGC 111 automatically receives the TMX status from the scheduler and execution engine 102.

The periodic sync point counter component 107 in the IT module 103 is also coupled to the TMGC 111, which in turn generates transactional memory (TMX) packets to include in the state packets generated at periodic sync points in IT packets 115. The periodic sync point counter component 107 sends a command signal to the TMXGC 111 to generate TMX packets as part of the periodic state packets written to the IT output packet stream. In one embodiment, the TMXGC is implemented as a sequence of executed instructions or micro-operations (also called uops) that the machine executes to generate TMX packets. As discussed above, the TMX packet is a two bit mode pattern in a packet log. The two bit mode pattern may indicate the TMX status change point for the IT packet 115. The embodiments of the present invention are not limited to a two bit mode pattern and the TMX packet may include patterns having more than two bit modes or less than two bit modes depending on architecture implementation.

The configuration component 109 in the IT module is also coupled to the TMXGC 111. The configuration component 109 allows the software to configure the frequency of periodic sync points as controlled by the Periodic Sync Pointer Counter Component 107, and may further allow the software to configure the inclusion/exclusion of specific TMX packets in the IT packets 115.

In one embodiment, the two bit mode pattern of the TMX packet includes InTX mode bit and a TXAbort mode bit. The InTX mode bit indicates when the processor is executing within a transaction, and hence changes in this bit indicate the beginning or end of a TMX operation. In one example, the InTX mode bit may be set (e.g., to 1) when the TMX operation begins and cleared (e.g., to 0) when the TMX operation commits or aborts. The TXAbort mode bit provides notification to the IT decoder that the TMX operation has been aborted. This abort notification informs the IT decoder that all of the packets between the InTX mode bit assertion and the TXAbort mode bit assertion represent instructions that do not commit their state. In one embodiment, the IT decoder discards all of the instructions associated with these packets. In one embodiment, the decoder marks these packets to later use the instructions associated with these packets. In one example, the TXAbort mode bit may be set (e.g., to 1) when the InTX mode bit transitions from 1 to 0 on an abort.

In one example, when the processor executes a Transaction Begin TMX instruction, the TMXGC 111 generates a TMX packet with the InTX mode bit set to 1 and TXAbort mode bit set to 0, which indicates the beginning of a transaction, i.e. TMXB. In another example, when the processor executes a Transaction Commit TMX instruction, the TMXGC 111 generates a TMX packet with the InTX mode bit set to 0 and the TXAbort mode bit set to 0, which indicates the commit of the transaction, i.e. TMXC. In a further example, when the TMXGC 111 receives indication of a transaction abort, the TMXGC 111 generates a TMX packet with the InTX mode bit set to 0 and the TXAbort mode bit set to 1, which indicates the abort of the transaction, i.e. TMXA.

In some embodiment, the TMGC 111 also generates a source transactional memory instruction pointer (STMXIP) packet and/or a target transactional memory instruction pointer (TTMXIP) packet associated with each TMX packet in the IT packets 115. The STMXIP packet provides the IP of instruction associated with the change in TMX state. In one embodiment, the STMXIP packet is generated along with the TMXB packet to provide the IP of the associated instruction at the beginning of the TMX operation. In another embodiment, the STMXIP packet is generated along with the TMXA packet to provide the IP of the associated instruction at the abort of the TMX operation. In a further embodiment, the STMXIP packet is generated along with TMXC packet to provide the IP of the associated instruction at the commit of the TMX operation.

The TTMXIP packet provides the IP of the next instruction to be executed at the abort of the TMX operation, which is needed if the abort operation causes a control flow transfer. As such, the decoder may know where the TMX began, where it aborted, where it committed, and where execution continued after any abort. In one embodiment, the decoder may discard the instruction bytes for all the packets between the beginning of the TMX operation and the abort of the TMX operation. In another embodiment, the decoder may mark instruction bytes for all the packets between the beginning of the TMX operation and the abort of the TMX operation.

As discussed above, the decoder begins decoding at the state packets, and the state packets provide current status information of the processing device. The TMXGC 111 sends the TMX packet in a series of state packets. The boundary packet in the packet log is always followed by a first byte of a packet, thus serving as the starting point for packet decode. As such, the IT decoder can search for the boundary packet and accurately decode the state packets after the boundary packet. By including a TMX packet among the state packets that immediately follows the boundary packet, the decoder is ensured of knowing the transaction status from the decode start point.

FIG. 1C illustrates a table of examples of IT packets 115 generated by the IT module 103 when tracing is enabled during execution flow 118, for example. As shown, when tracing is enabled while executing the instruction sequence 118, a packet log of the IT packets 115 are generated by the TMGC 111. The IT packets 115 include a boundary packet 140, which is followed by a set of state packets 141, which are followed by a TMX packet 142. The TMX packet 142 may be the two bit mode pattern described above, which includes an InTX mode bit and a TXAbort bit. The InTX mode bit provides notification to the decoder of a beginning of a TMX operation and the TXAbort mode bit provides notification that the TMX operation has aborted. In this example, the two bit mode pattern of the TMX packet 142 includes the InTX mode bit set to 0 and the TXAbort mode bit set to 0. As such, the execution flow 118 is not in transaction. A source transactional memory instruction pointer (STMXIP) packet 143 is generated after the TMX packet 142. The STMXIP packet 143 provides the IP of the associated instruction of the TMX operation. In one embodiment, the STMXIP packet 143 may be generated before the TMX packet 142. The STMXIP packet 143 is followed by a set of state packets 144 and a state end packet 145.

In one example, in the midst of control flow, a TMX operation begins in the execution flow 118. This TMX operation begin is represented in a set of event packets 146 in the output packet log 115, which causes to generate a TMX begin (TMXB) 147 as a TMX packet in a beginning of the TMX operation. The TMXB packet 147 may be the two mode bit pattern described above, which includes an InTX mode bit and a TXAbort bit. The InTX mode bit provides notification to the decoder of a beginning of a TMX operation and the TXAbort mode bit provides notification that the TMX operation has aborted. For example, when the TMXB packet 147 indicates occurrence of a Transaction Begin TMX instruction, the two mode bit pattern of the TMXB packet 147 may include the InTX mode bit set to 1 and the TXAbort mode bit set to 0. A first source transactional memory instruction pointer (STMXIP) packet 148 is generated after the TMXB packet 147. The first STMXIP packet 148 provides the IP of the associated instruction at the beginning of the TMX operation. In one embodiment, the first STMXIP packet 148 may be generated before the TMXB packet 147.

In one example, a TMX operation aborts in the execution flow, which is represented by a TMX abort (TMXA) packet 150 as the TMX packet. The TMXA packet 150 may also follow the two bit mode pattern described above. For example, when the TMXA packet 150 indicates occurrence of a transaction abort, the two bit mode pattern of the TMXA packet 150 may include the InTX mode bit set to 0 and the TXAbort mode bit set to 1. A second STMXIP packet 151 is generated after the TMXA packet 150. The second STMXIP packet 151 provides the IP of the associated instruction to be executed at the abort of the TMX operation. In one embodiment, the second STMXIP packet 151 may be generated before the TMXA packet 150. The second STMXIP packet 151 is followed by a target transactional memory instruction pointer (TTMXIP) packet 152, which provides the IP of the next instruction to be executed after the abort of the TMX operation. In one embodiment, the TTMXIP packet 152 is generated before the TMXA packet 150. The TTMXIP packet 152 may be followed by another set of event packets 153.

In the example, the periodic sync point is created in the execution flow 118, which generates another boundary packet 154, which is followed by a set of state packets 155, which is followed by an another TMX packet 156. Similar to the above, the two bit mode pattern of the TMX packet 156 includes the InTX mode bit set to 0 and the TXAbort mode bit set to 0. Another STMXIP packet 157 is generated after the TMX packet 156. In one embodiment, the STMXIP packet 157 may be generated before the TMX packet 156. The STMXIP packet 157 is followed by another set of state packets 158 and a state end packet 159.

Although, not shown, the TMX instructions may also result in commit of the TMX operation, which includes generating a TMX commit (TMXC) packet. When using the two bit mode pattern, the TMXC packet may include the InTX mode bit set to 0 and the TXAbort mode bit set to 0.

Referring back to FIG. 1A, in one embodiment, a user may wish to trace instructions executed within a specific IP range. In this scenario, the TMXGC 111 may generate and output TMX packets from instructions that both fall within the specific IP range and outside the specific IP range. However, the TMXGC 111 need not generate and output the STMXIP packet and the TTMXIP packet associated with the TMX packet when the IP is outside of the specific IP range. As a result, the decoder is allowed to appropriately handle the packets generated either by TMX operations that begin in the IP region but end outside the IP region, or by TMX operations that begin outside the IP region but end within the IP region.

Figure 2A:
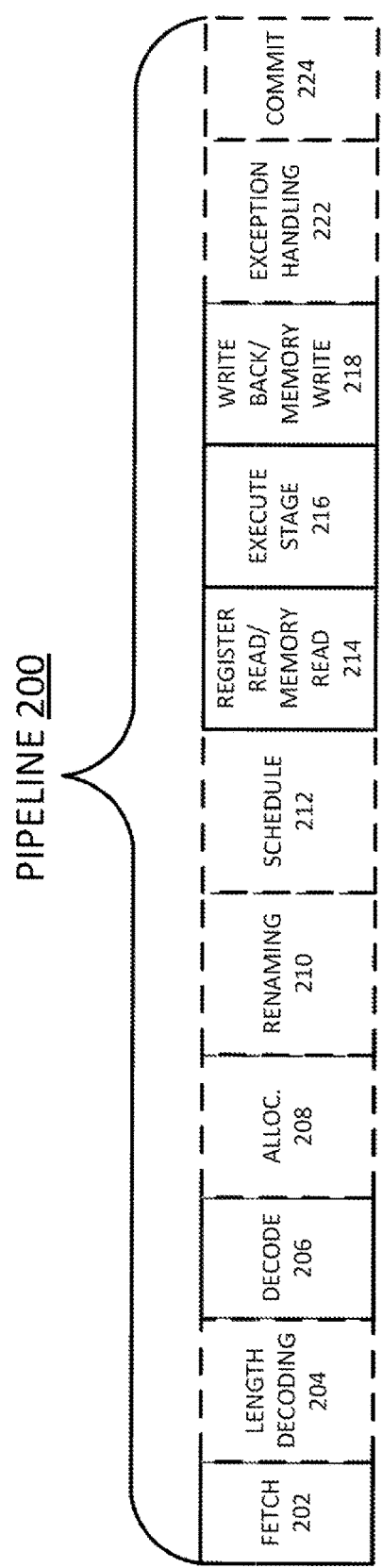
FIG. 2A is a block diagram illustrating both exemplary in order pipeline and an exemplary register renaming, out-of-order issue/execution pipeline in accordance with described embodiments.
Figure 2B:
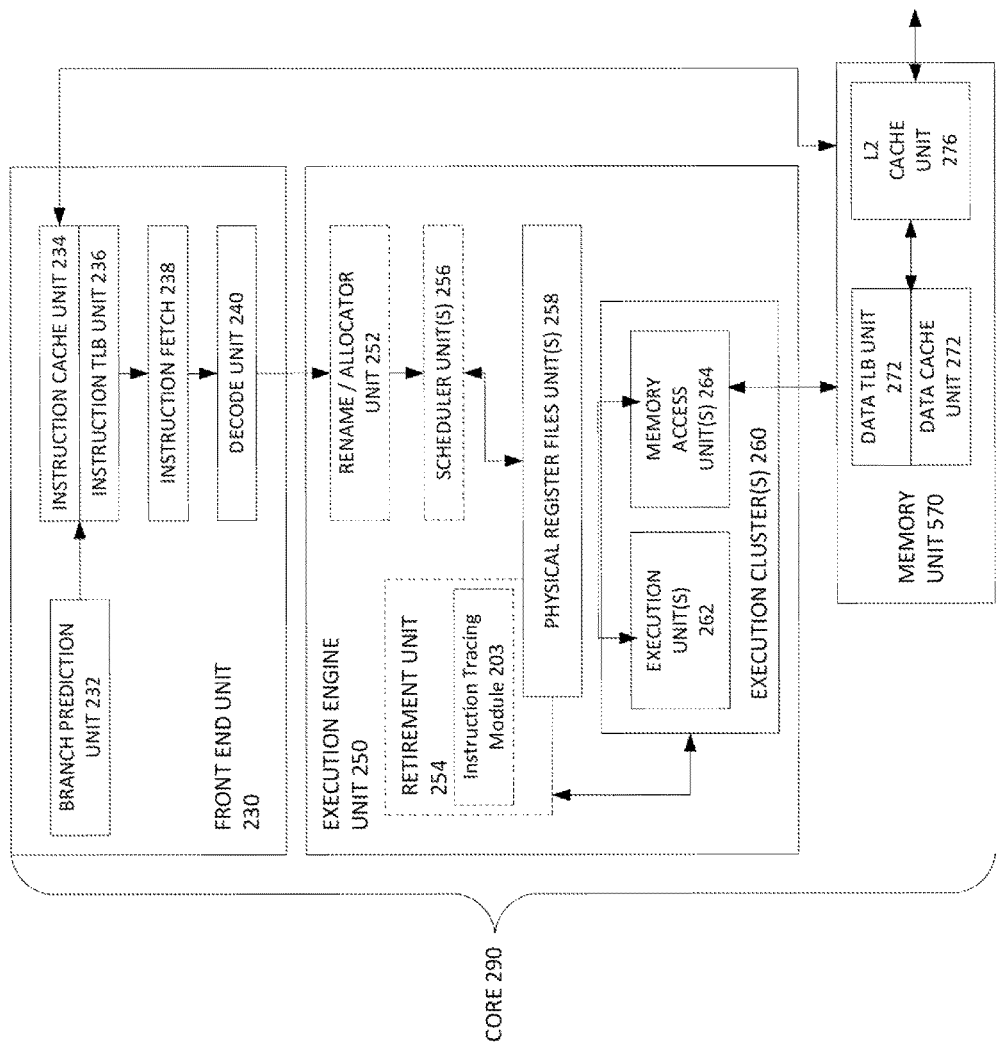
FIG. 2B is a block diagram illustrating both an exemplary embodiment of an in-order architecture core and an exemplary register renaming, out-of-order issue/execution architecture core to be included in a processor in accordance with described embodiments.

FIG. 2A is a block diagram illustrating an in-order pipeline and a register renaming stage, out-of-order issue/execution pipeline of a processor tracking execution mode and transactional memory execution in an instruction trace system according to at least one embodiment of the invention. FIG. 2B is a block diagram illustrating an in-order architecture core and a register renaming logic, out-of-order issue/execution logic to be included in a processor according to at least one embodiment of the invention. The solid lined boxes in FIG. 2A illustrate the in-order pipeline, while the dashed lined boxes illustrates the register renaming, out-of-order issue/execution pipeline. Similarly, the solid lined boxes in FIG. 2B illustrate the in-order architecture logic, while the dashed lined boxes illustrates the register renaming logic and out-of-order issue/execution logic.

In FIG. 2A, a processor pipeline 200 includes a fetch stage 202, a length decode stage 204, a decode stage 206, an allocation stage 208, a renaming stage 210, a scheduling (also known as a dispatch or issue) stage 212, a register read/memory read stage 214, an execute stage 216, a write back/memory write stage 218, an exception handling stage 222, and a commit stage 224. In some embodiments, the stages are provided in a different order and different stages may be considered in-order and out-of-order.

In FIG. 2B, arrows denote a coupling between two or more units and the direction of the arrow indicates a direction of data flow between those units. FIG. 2B shows processor core 290 including a front end unit 230 coupled to an execution engine unit 250, and both are coupled to a memory unit 70.

The core 290 may be a reduced instruction set computing (RISC) core, a complex instruction set computing (CISC) core, a very long instruction word (VLIW) core, or a hybrid or alternative core type. As yet another option, the core 290 may be a special-purpose core, such as, for example, a network or communication core, compression engine, graphics core, or the like.

The front end unit 230 includes a branch prediction unit 232 coupled to an instruction cache unit 234, which is coupled to an instruction translation lookaside buffer (TLB) 236, which is coupled to an instruction fetch unit 238, which is coupled to a decode unit 240. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 234 is further coupled to a level 2 (L2) cache unit 276 in the memory unit 270. The decode unit 240 is coupled to a rename/allocator unit 252 in the execution engine unit 250.

The execution engine unit 250 includes the rename/allocator unit 252 coupled to a retirement unit 254 and a set of one or more scheduler unit(s) 256. The retirement unit 254 may include real time instruction trace component 203 to generate ITS packets. The scheduler unit(s) 256 represents any number of different schedulers, including reservations stations, central instruction window, etc. The scheduler unit(s) 256 is coupled to the physical register file(s) unit(s) 258. Each of the physical register file(s) units 258 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 258 is overlapped by the retirement unit 254 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 254 and the physical register file(s) unit(s) 258 are coupled to the execution cluster(s) 460. The execution cluster(s) 260 includes a set of one or more execution units 262 and a set of one or more memory access units 264. The execution units 262 may perform various operations (e.g., shifts, addition, subtraction, multiplication) and on various types of data (e.g., scalar floating point, packed integer, packed floating point, vector integer, vector floating point).

While some embodiments may include a number of execution units dedicated to specific functions or sets of functions, other embodiments may include one execution unit or multiple execution units that all perform all functions. The scheduler unit(s) 256, physical register file(s) unit(s) 258, and execution cluster(s) 260 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which the execution cluster of this pipeline has the memory access unit(s) 264). It should also be understood that where separate pipelines are used, one or more of these pipelines may be out-of-order issue/execution and the rest in-order.

The set of memory access units 264 is coupled to the memory unit 270, which includes a data TLB unit 272 coupled to a data cache unit 274 coupled to a level 2 (L2) cache unit 276. In one exemplary embodiment, the memory access units 264 may include a load unit, a store address unit, and a store data unit, each of which is coupled to the data TLB unit 272 in the memory unit 270. The L2 cache unit 276 is coupled to one or more other levels of cache and eventually to a main memory.

By way of example, the exemplary register renaming, out-of-order issue/execution core architecture may implement the pipeline 200 as follows: 1) the instruction fetch 38 performs the fetch and length decoding stages 202 and 204; 2) the decode unit 240 performs the decode stage 206; 3) the rename/allocator unit 252 performs the allocation stage 208 and renaming stage 210; 4) the scheduler unit(s) 256 performs the schedule stage 212; 5) the physical register file(s) unit(s) 258 and the memory unit 270 perform the register read/memory read stage 214; the execution cluster 260 perform the execute stage 216; 6) the memory unit 270 and the physical register file(s) unit(s) 258 perform the write back/memory write stage 218; 7) various units may be involved in the exception handling stage 222; and 8) the retirement unit 254 and the physical register file(s) unit(s) 258 perform the commit stage 224.

The core 290 may support one or more instructions sets (e.g., the x86 instruction set (with some extensions that have been added with newer versions); the MIPS instruction set of MIPS Technologies of Sunnyvale, Calif.; the ARM instruction set (with additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in-order architecture. While the illustrated embodiment of the processor also includes a separate instruction and data cache units 234/274 and a shared L2 cache unit 276, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 3:
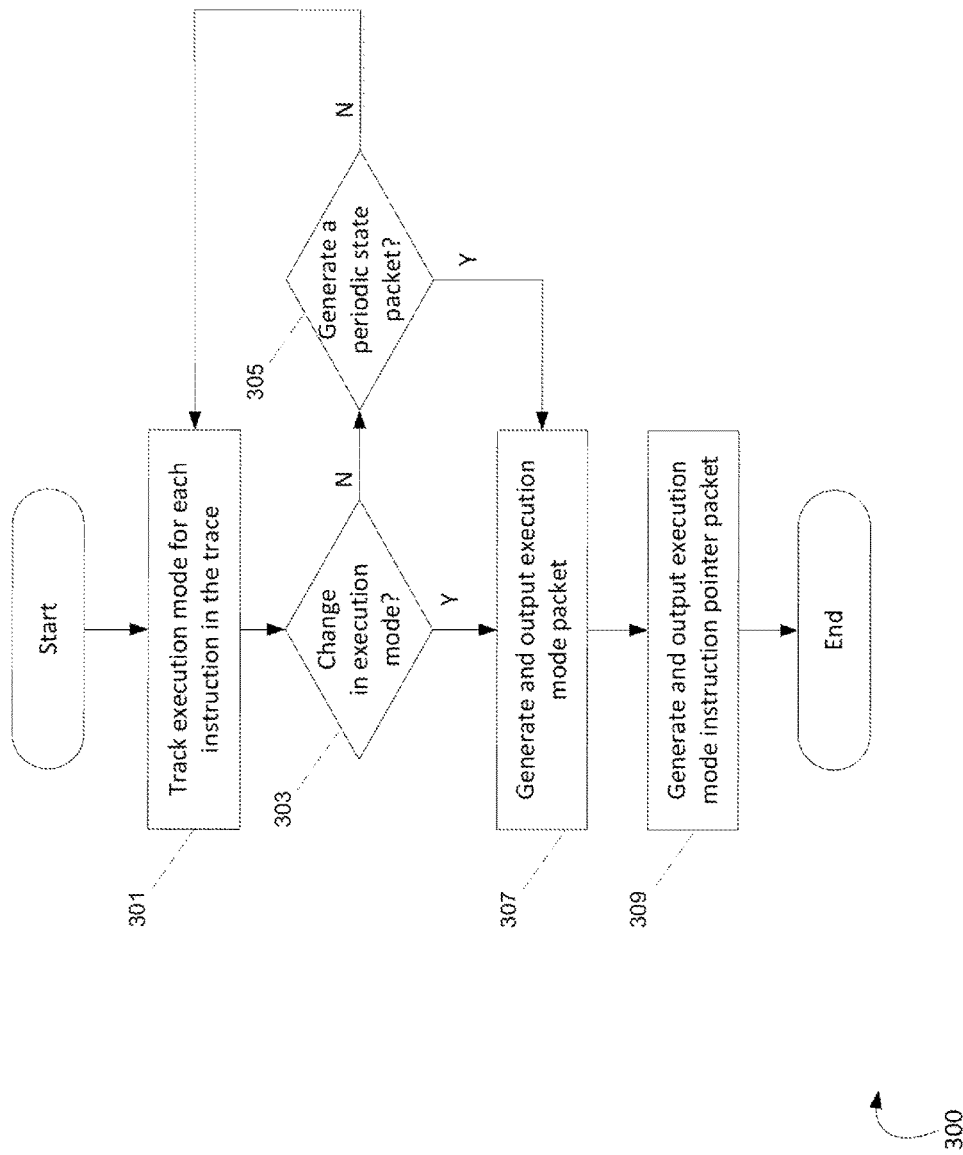
FIG. 3 is a flow diagram illustrating an example of a method for tracking execution mode in the instruction trace in the ITS.

FIG. 3 is a flow diagram illustrating an example of a method 300 for tracking execution mode by an instruction trace system. Method 300 may be performed by processing logic that may include hardware (e.g. circuitry, dedicated logic, programmable logic, microcode, etc.). The numbering of the blocks presented is for the sake of clarity and is not intended to prescribe an order of operations in which the various blocks may occur. In one embodiment, method 300 is performed by IT module 103 described with respect to FIG. 1A.

Beginning with block 301, the IT module tracks execution mode for each of the instructions in the trace. For example, the EMGC 105 tracks the execution mode provided by the scheduler and execution unit 102. The execution mode provides a current execution mode value of the processing device. The execution mode may include, but is not limited to, 8-bit mode, 16-bit mode, 32-bit mode, 48-bit mode and 64-bit mode. At block 303, it is determined whether there is a change in the execution mode for the instruction in the trace. If it is determined at block 303 that there is no change in the execution mode, the method proceeds to block 305 where it is determined whether a periodic state packet is to be generated. If it is determined at block 305 that a periodic state packet is not to be generated, block 301 is repeated. In one embodiment, the periodic sync point counter component 107 determines when to generate the periodic state packet. If it is determined at block 305 that a periodic state packet is to be generated then method proceeds to block 307, where the EMGC 105 generates and outputs an execution mode (EM) packet. As discussed above, the EM packet provides current execution mode of the processing device.

However, if it is determined at block 303 that there is a change in execution mode, then method proceeds to 307 where the EMGC 105 generates and outputs an execution mode (EM) packet in the IT packets. As discussed above, the EM packet also provides an indication of an event in the software, which changed the execution mode, and an indication of the changed execution mode. In one embodiment, the EM packet is a two-bit pattern in a packet log of the IT module, which serves as the execution mode change point for the IT packet 115. At block 309, the EMGC 105 generates and outputs an EMIP packet associated with the EM packet in the IT packets. In one embodiment, the EMIP packet follows the EM packet. As discussed above, the EMIP packet includes the IP of a first instruction that executes in the changed execution mode state.

Figure 4:
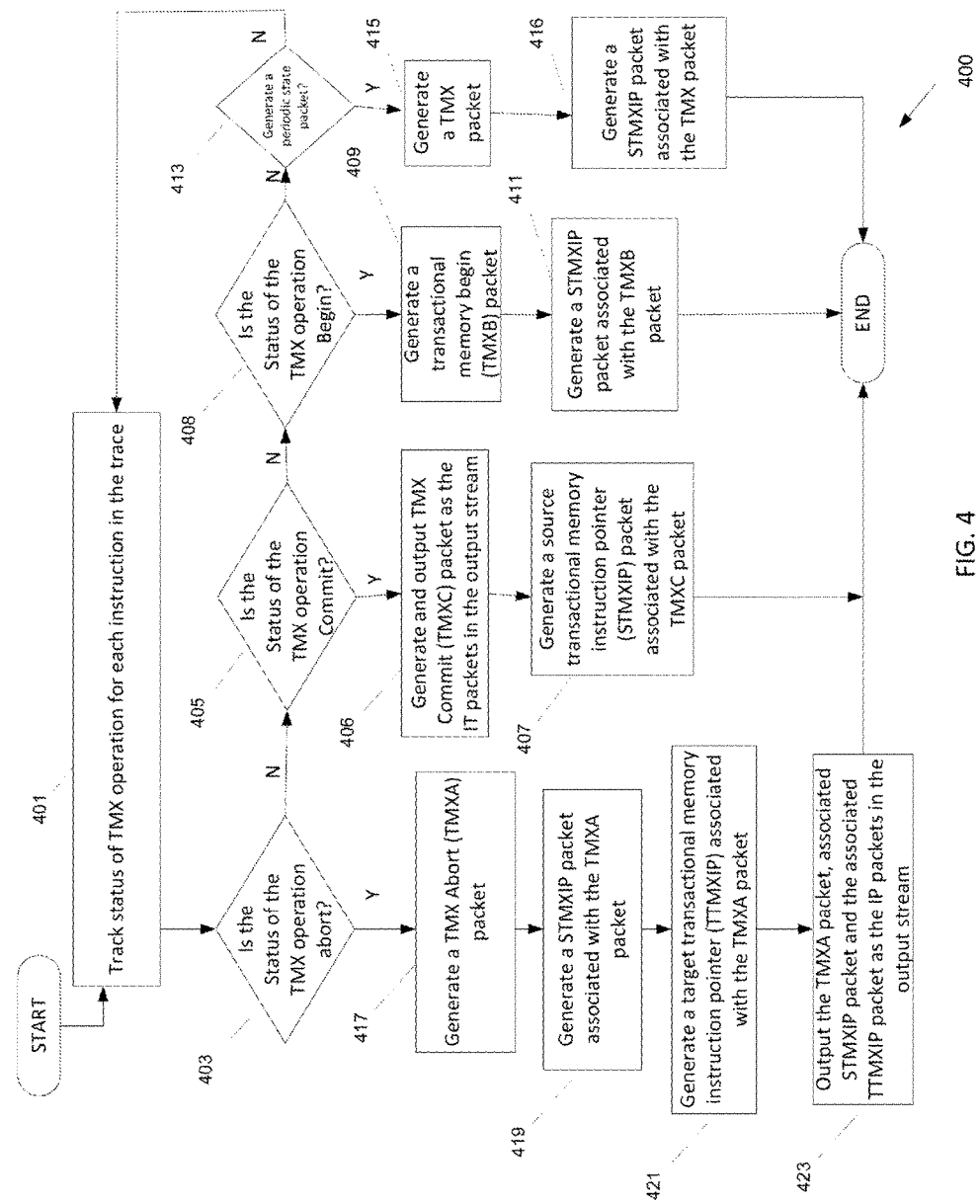
FIG. 4 is a flow diagram illustrating an example of a method for tracking transactional memory execution in the instruction trace in the ITS.

FIG. 4 is a flow diagram illustrating an example of a method 400 for tracking transactional memory execution by an instruction trace system. Method 400 may be performed by processing logic that may include hardware (e.g. circuitry, dedicated logic, programmable logic, microcode, etc.). The numbering of the blocks presented is for the sake of clarity and is not intended to prescribe an order of operations in which the various blocks may occur. In one embodiment, method 400 is performed by IT module 103 described with respect to FIG. 1A.

Beginning with block 401, the IT module 103 tracks status of transactional memory (TMX) for each of the instructions in the trace. For example, the TMXGC 111 tracks status of the TMX operation provided by the scheduler and execution unit 102. At block 403, it is determined whether the status of the TMX operation for the instruction in the trace is abort. If at block 403, if it is determined that the status of the TMX operation is not abort, then at block 405, it is determined whether the status of the TMX operation is commit. If at block 405, it is determined that the status of the TMX operation is commit, then at block 406, a TMX commit (TMXC) is generated as the TMXC packet and outputted as the IT packets 115 in the output stream. The TMXGC 111 generates the TMXC packet, which indicates the commit of the TMX operation. For example, the TMXC packet is the Transaction Commit as the TMX instruction with the InTX mode bit set to 0 and TXAbort mode bit set to 0. At block 407, a source transactional memory instruction pointer (STMXIP) packet associated with the TMXC packet is generated. The STMXIP packet provides the IP of the source associated with the TMX instructions. As an example, the STMXIP packet provides the IP of the associated instruction at the commit of the TMX operation. In one embodiment, the STMXIP packet may be generated before the TMXC packet.

If at block 405, it is determined that the status of the TMX operation is not commit, then the method proceeds to block 408 where it is determined whether the status of the TMX operation is begin. If at block 408, it is determined that the status of the TMX operation is begin, then at block 409, a TMX begin (TMXB) is generated as a TMX packet. The TMXGC 111 generates the TMXB packet, which indicates the beginning of the TMX operation. The TMX packet includes the two bit mode pattern, which includes InTX mode bit and TXAbort bit. The InTX mode bit provides notification to the decoder of a beginning of the TMX operation and the TXAbort mode bit provides notification that the TMX operation has aborted. For example, the TMXB packet is the Transaction Begin as the TMX instruction with the InTX mode bit set to 1 and TXAbort mode bit set to 0. At block 411, a source transactional memory instruction pointer (STMXIP) packet associated with the TMXB packet is generated. The STMXIP packet provides the IP of the source associated with the TMX instructions. As an example, the STMXIP packet provides the IP of the associated instruction at the beginning of the TMX operation. In one embodiment, the STMXIP packet may be generated before the TMXB packet.

If at block 408, the status of the TMX operation is not begin, then there is no change in the status of the TMX operation and at block 413, it is determined whether a periodic state packet should be generated. As stated above, the state packet provides current status information of the processor. If it is determined at block 413 that a periodic state packet is not to be generated, block 401 is repeated. In one embodiment, the periodic sync point counter component 107 determines when to generate the periodic state packet. If it is determined at block 413 that a periodic state packet is to be generated then method proceeds to block 415, where the TMXGC 111 generates and outputs a TMX packet As discussed above, the TMX packet includes the two bit mode pattern, which includes InTX mode bit and TXAbort bit. In this example, the TMX packet with InTX mode bit set to 0 and TXAbort mode bit set to 0 indicates that the execution flow is not in transaction. At block 416, the STMXIP packet associated with the TMX packet is generated. As discussed above, the STMXIP packet provides the IP of the source associated with the TMX instructions. In one embodiment, the STMXIP packet may be generated before the TMX packet.

Returning back to bock 403, if it is determined that the status of the TMX operation is abort, then the method proceeds to 417, where a TMX Abort (TMXA) packet is generated as the TMX packet by the TMXGC 111. As discussed above, the TMXA packet provides an indication of abort in the status of the TMX operation. For example, the TMXA packet is the Transaction Abort as the TMX instruction with the InTX mode bit is set to 0 and the TXAbort mode bit is set to 1. At block 419, a source transactional memory instruction pointer (STMXIP) packet associated with the TMXA packet is generated by the TMXGC 111. The STMXIP packet provides the IP at which the abort of the TMX operation occurred. In one embodiment, the STMXIP packet is generated before the TMXA packet. At block 421, the EMGC 105 generates a target transactional memory instruction pointer (TTMXIP) packet associated with the TMXA packet. The TTMXIP packet provides the IP of the next instruction to be executed after the abort of the TMX operation. In one embodiment, the TTMXIP packet is generated before the TMXA packet. At block 423, the EMGC 105 outputs the TMXA packet, the associated STMXIP packet and the associated TTMXIP packet as the IT packets 115 in the output stream.

Figure 5:
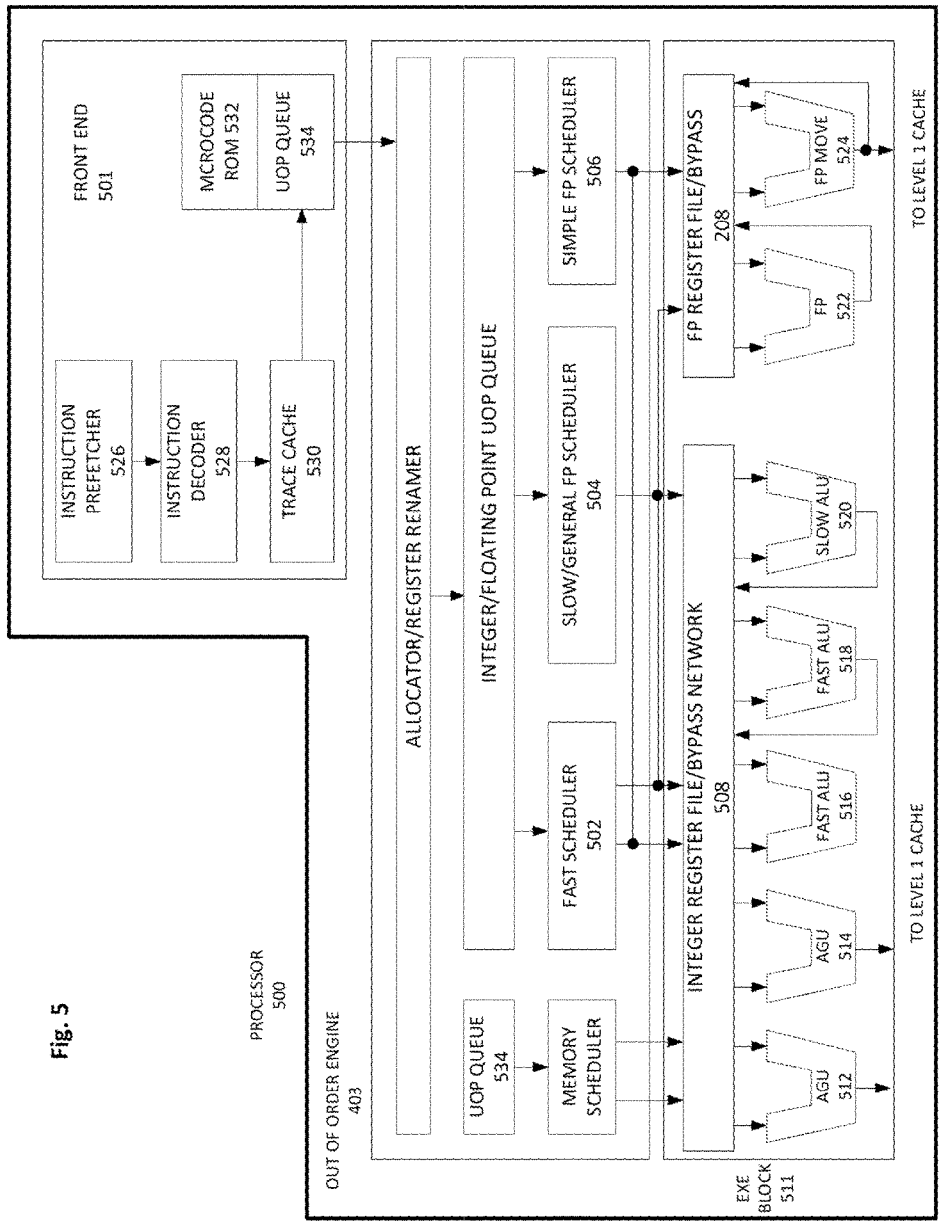
FIG. 5 is a block diagram illustrating a processor according to one embodiment.

FIG. 5 is a block diagram illustrating a micro-architecture for a processor 500 that includes logic circuits to perform instructions in accordance with one embodiment of the invention. In one embodiment, processor 500 tracks execution mode and transactional memory execution in an instruction trace system. In some embodiments, an instruction in accordance with one embodiment can be implemented to operate on data elements having sizes of byte, word, double-word, quadword, etc., as well as datatypes, such as single and double precision integer and floating point datatypes. In one embodiment the in-order front end 501 is the part of the processor 500 that fetches instructions to be executed and prepares them to be used later in the processor pipeline. The front end 501 may include several units. In one embodiment, the instruction prefetcher 526 fetches instructions from memory and feeds them to an instruction decoder 528, which in turn decodes or interprets them. For example, in one embodiment, the decoder decodes a received instruction into one or more operations called "micro-instructions" or "micro-operations" (also called micro op or uops) that the machine can execute.

In other embodiments, the decoder parses the instruction into an opcode and corresponding data and control fields that are used by the micro-architecture to perform operations in accordance with one embodiment. In one embodiment, the trace cache 530 takes decoded uops and assembles them into program ordered sequences or traces in the uop queue 534 for execution. When the trace cache 530 encounters a complex instruction, the microcode ROM 532 provides the uops needed to complete the operation.

Some instructions are converted into a single micro-op, whereas others use several micro-ops to complete the full operation. In one embodiment, if more than four micro-ops are needed to complete an instruction, the decoder 528 accesses the microcode ROM 532 to do the instruction. For one embodiment, an instruction can be decoded into a small number of micro ops for processing at the instruction decoder 528. In another embodiment, an instruction can be stored within the microcode ROM 532 should a number of micro-ops be needed to accomplish the operation. The trace cache 530 refers to an entry point programmable logic array (PLA) to determine a correct micro-instruction pointer for reading the micro-code sequences to complete one or more instructions in accordance with one embodiment from the micro-code ROM 532. After the microcode ROM 532 finishes sequencing micro-ops for an instruction, the front end 501 of the machine resumes fetching micro-ops from the trace cache 530.

The out-of-order execution engine 503 is where the instructions are prepared for execution. The out-of-order execution logic has a number of buffers to smooth out and reorder the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 502, slow/general floating point scheduler 504, and simple floating point scheduler 506. The uop schedulers 502, 504, 506 determine when a uop is ready to execute based on the readiness of their dependent input register operand sources and the availability of the execution resources the uops use to complete their operation. The fast scheduler 502 of one embodiment can schedule on each half of the main clock cycle while the other schedulers can schedule once per main processor clock cycle. The schedulers arbitrate for the dispatch ports to schedule uops for execution.

Register files 508, 510 sit between the schedulers 502, 504, 506, and the execution units 512, 514, 516, 518, 520, 522, 524 in the execution block 511. There is a separate register file 208, 510 for integer and floating point operations, respectively. Each register file 508, 510, of one embodiment also includes a bypass network that can bypass or forward just completed results that have not yet been written into the register file to new dependent uops. The integer register file 508 and the floating point register file 510 are also capable of communicating data with the other. For one embodiment, the integer register file 508 is split into two separate register files, one register file for the low order 32 bits of data and a second register file for the high order 32 bits of data. The floating point register file 510 of one embodiment has 128 bit wide entries because floating point instructions typically have operands from 64 to 128 bits in width.

The execution block 511 contains the execution units 512, 514, 516, 518, 520, 522, 524, where the instructions are actually executed. This section includes the register files 508, 510, that store the integer and floating point data operand values that the micro-instructions use to execute. The execution block 511 may include real time instruction trace component to generate IT packets. The processor 500 of one embodiment is comprised of a number of execution units: address generation unit (AGU) 512, AGU 514, fast ALU 516, fast ALU 518, slow ALU 520, floating point ALU 522, floating point move unit 524. For one embodiment, the floating point execution blocks 522, 524, execute floating point, MMX, SIMD, and SSE, or other operations. The floating point ALU 522 of one embodiment includes a 64 bit by 64 bit floating point divider to execute divide, square root, and remainder micro-ops. For embodiments of the invention, instructions involving a floating point value may be handled with the floating point hardware.

In one embodiment, the ALU operations go to the high-speed ALU execution units 516, 518. The fast ALUs 516, 518, of one embodiment can execute fast operations with an effective latency of half a clock cycle. For one embodiment, most complex integer operations go to the slow ALU 520 as the slow ALU 520 includes integer execution hardware for long latency type of operations, such as a multiplier, shifts, flag logic, and branch processing. Memory load/store operations are executed by the AGUs 512, 514. For one embodiment, the integer ALUs 516, 518, 520 are described in the context of performing integer operations on 64 bit data operands. In alternative embodiments, the ALUs 516, 518, 520 can be implemented to support a variety of data bits including 16, 32, 128, 256, etc. Similarly, the floating point units 522, 524 can be implemented to support a range of operands having bits of various widths. For one embodiment, the floating point units 522, 524 can operate on 128 bits wide packed data operands in conjunction with SIMD and multimedia instructions.

In one embodiment, the uops schedulers 502, 504, 506 dispatch dependent operations before the parent load has finished executing. As uops are speculatively scheduled and executed in processor 500, the processor 500 also includes logic to handle memory misses. If a data load misses in the data cache, there can be dependent operations in flight in the pipeline that have left the scheduler with temporarily incorrect data. A replay mechanism tracks and re-executes instructions that use incorrect data. The dependent operations should be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data. For the discussions below, the registers are understood to be data registers designed to hold packed data, such as 64 bits wide MMX registers (also referred to as 'mm' registers in some instances) in microprocessors enabled with the MMX™ technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not differentiate between the two data types. In one embodiment, integer and floating point are contained in either the same register file or different register files. Furthermore, in one embodiment, floating point and integer data may be stored in different registers or the same registers.

Figure 6A:
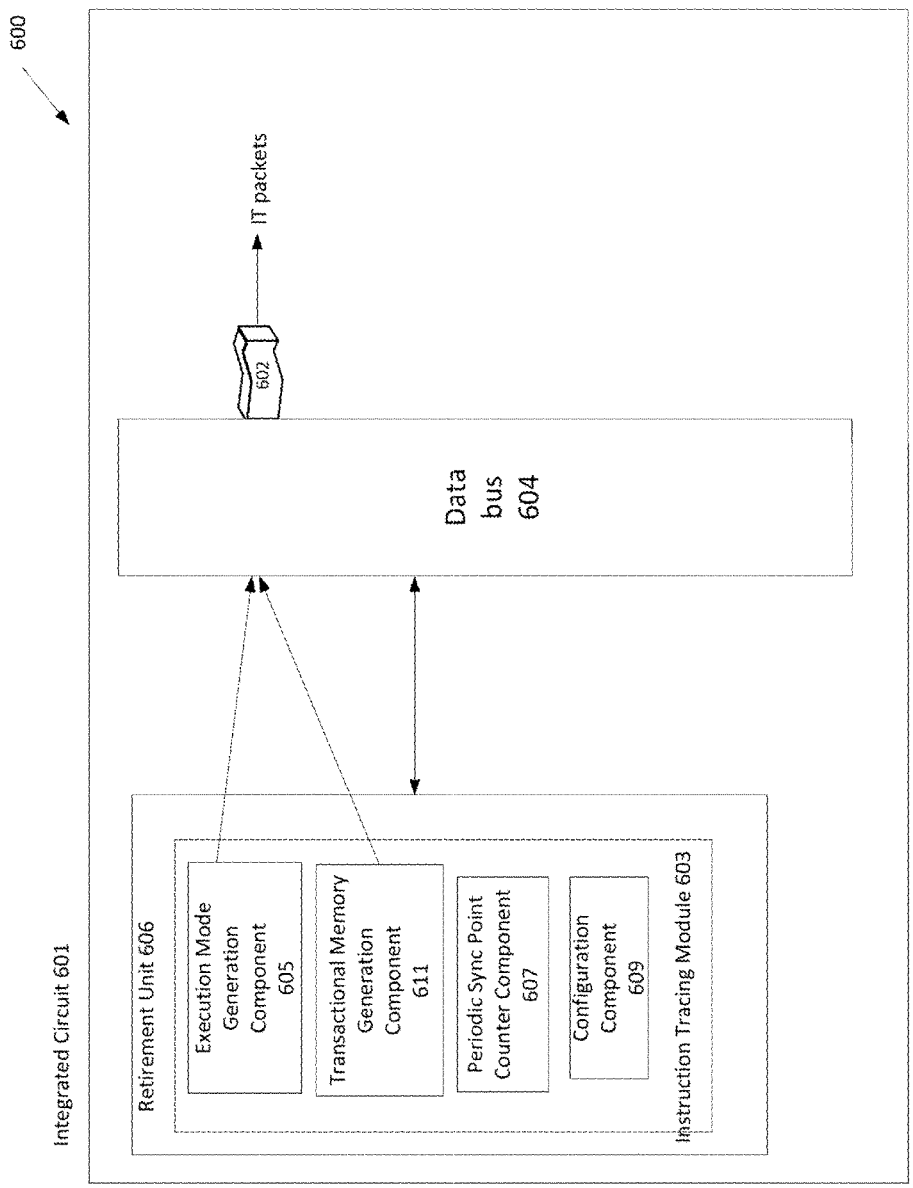
FIG. 6A illustrates an alternative exemplary architecture in accordance with which embodiments may operate.

FIG. 6A illustrates an alternative exemplary architecture in accordance with which embodiments may operate. In one embodiment, the integrated circuit 601 includes instruction tracing logic 603 to trace instructions of a traced application, mode, or code region, as the instructions are executed by the integrated circuit 601; a retirement unit 606 to track the tracks execution mode and transactional memory execution in real time information trace flow. The retirement unit may include an execution mode generation component 605 to generate a plurality of execution mode packets describing the change in execution mode for an instruction in the trace. The retirement unit 606 to also include a periodic sync point counter component 607 to generate a plurality of packets describing a beginning of the trace instructions. The retirement unit 606 to also include a configuration component 609, which allows software to configure the frequency of these periodic sync points. The retirement unit 606 may also include a transactional memory generation component (TMXGC) 111 to generate a plurality of TMX packets describing the changes in the status of TMX instructions of the trace. In one embodiment, the retirement unit 606 implements the instruction tracing logic 603.

In one embodiment, the retirement unit 606 includes ITS logic to implement the instruction tracing module 603. In one embodiment, the IT logic implementing the instruction tracing component 603 includes an execution mode generation component 605, periodic sync point counter component 607, configuration component 609 and transactional memory generation component 611. In one embodiment, execution mode generation component 605 outputs packets, such as the IT packets 602 depicted on the data bus 604. In one embodiment, transactional memory generation component also outputs packets such as the IT packets 602 depicted on the data bus 604. In one embodiment, logic implementing the instruction tracing component 603 may be implemented in hardware. In one embodiment, logic implementing the instruction tracing component 603 may be implemented in microcode. In one embodiment, logic implementing the instruction tracing component 603 may be implemented in a combination hardware and microcode.

In one embodiment, the integrated circuit is a Central Processing Unit (CPU). In one embodiment, the central processing unit is utilized for one of a tablet computing device or a smartphone.

In accordance with one embodiment, such an integrated circuit 601 thus initiates instruction tracing (e.g., via instruction tracing module 603) for instructions of a traced application, mode, or code region, as the instructions are executed by the integrated circuit 601; generates a plurality of execution mode (EM) packets describing the change in the execution mode during instruction tracing at the change point (e.g., via execution mode generation component 605 as controlled by the instruction tracing component 603); the plurality of EM packets include two bit pattern in a packet log, followed by execution mode instruction pointer (EMIP) packet generated to indicate the first instruction to be executed in the changed execution mode; the plurality of packets generated to indicate the state of the integrated circuit 601 at a periodic sync point controlled by the Periodic Sync pointer Counter 607 including a plurality of execution mode (EM) packets describing the state of the modes and the state of the instruction pointer at the time of the status packets were generated. In one embodiment, the integrated circuit 601 generates and outputs the two bit pattern, which is utilized to generate the EM packet as the execution mode value change point for packet decode. In one embodiment, the integrated circuit 601 generates a plurality of transactional memory (TMX) packets describing the beginning of a TMX operation and change in status of the TMX operation during instruction tracing at the change point (e.g., via transactional memory generation component 611 as controlled by the instruction tracing component 603); the plurality of TMX packets include a two bit mode pattern in a packet log, followed by one or both of source transactional memory instruction pointer (STMXIP) packet or target transactional memory instruction pointer (TTMXIP) packet; the plurality of packets generated to indicate the state of the integrated circuit 601 at a periodic sync point controlled by the Periodic Sync pointer Counter 607 including a plurality of execution mode (EM) packets and execution mode instruction pointer (EMIP) describing the state of the modes and the state of the instruction pointer respectively at the time of the status packets were generated.

Figure 6B:
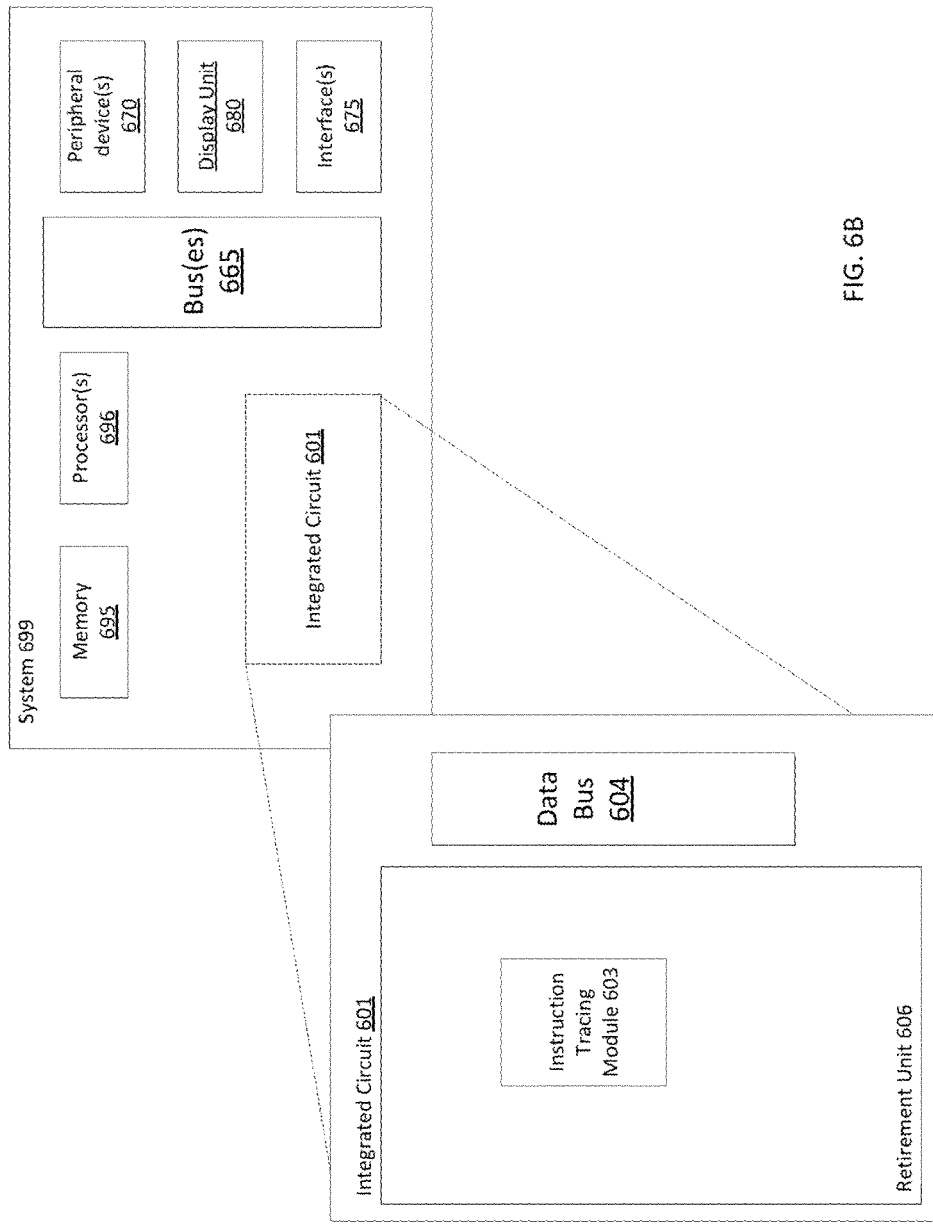
FIG. 6B shows a diagrammatic representation of a system in accordance with which embodiments may operate, be installed, integrated, or configured.

In one embodiment, the STMXIP packet provides the IP of the associated instruction at a beginning of the TMX operation. In another embodiment, the STMXIP packet provides the IP of the associated instruction at the change in status of the TMX operation. In one embodiment, the TTMXIP packet provides the IP of the next instruction to be executed after the TMX operation when the change in status is abort of the TMX operation. In one embodiment, the integrated circuit 601 generates and outputs the two bit mode pattern, which is utilized to generate the TMX packet as the beginning point of the TMX operation and change point in status of the TMX operation for packet execution. FIG. 6B shows a diagrammatic representation of a system 699 in accordance with which embodiments may operate, be installed, integrated, or configured.

In one embodiment, system 699 includes a memory 695 and a processor or processors 696. For example, memory 695 may store instructions to be executed and processor(s) 696 may execute such instructions. System 699 includes communication bus(es) 665 to transfer transactions, instructions, requests, and data within system 699 among a plurality of peripheral device(s) 670 communicably interfaced with one or more communication buses 665 and/or interface(s) 675. Display unit 680 is additionally depicted within system 699.

Distinct within system 699 is integrated circuit 601, which may be installed and configured in a compatible system 699, or manufactured and provided separately so as to operate in conjunction with appropriate components of system 699.

In accordance with one embodiment, system 699 includes at least a display unit 680 and an integrated circuit 601. The integrated circuit 601 may operate as, for example, a processor or as another computing component of system 699. In such an embodiment, the integrated circuit 601 of system 699 includes at least: a data bus 604, and an instruction tracing signal 603 including a state packet generation component (not shown) and event packet generation component (not shown) to generate a plurality of IT packets describing the traced instructions. In one embodiment, the IT packets include information describing a status of the processor and a synchronization point in the traced instructions.

In accordance with one embodiment, such a system 699 embodies a tablet or a smartphone, in which the display unit 680 is a touchscreen interface of the tablet or the smartphone; and further in which the integrated circuit 601 is incorporated into the tablet or smartphone.

Figure 7:
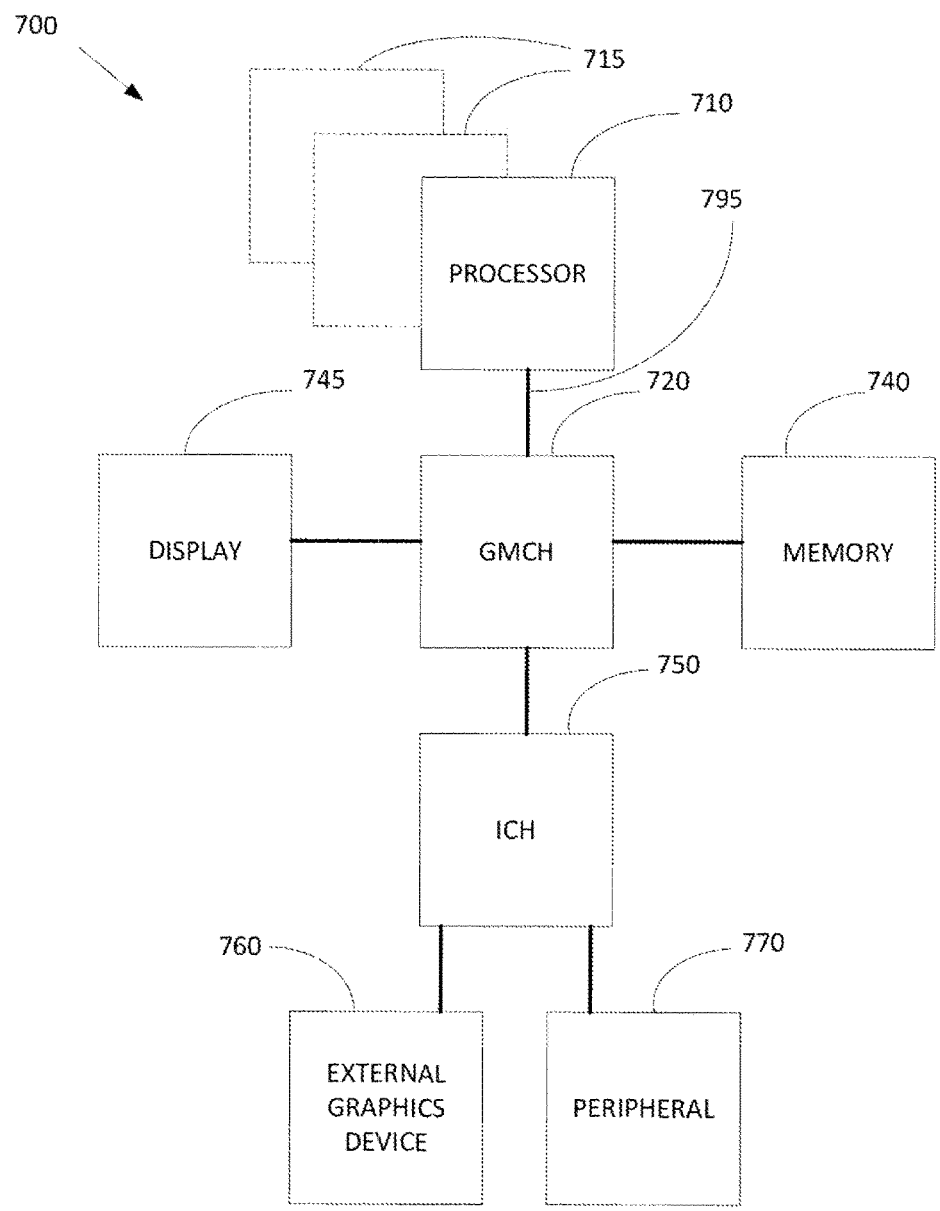
FIG. 7 illustrates a block diagram of a computer system according to one embodiment.

Referring now to FIG. 7, shown is a block diagram of a system 700 in accordance with one embodiment of the invention. The system 700 may include one or more processors 710, 715, which are coupled to graphics memory controller hub (GMCH) 720. The optional nature of additional processors 715 is denoted in FIG. 7 with broken lines. In one embodiment, processors 710, 715 track execution mode and transactional memory execution in an instruction trace system.

Each processor 710, 715 may be some version of the circuit, integrated circuit, processor, and/or silicon integrated circuit as described above. However, it should be noted that it is unlikely that integrated graphics logic and integrated memory control units would exist in the processors 710, 715. FIG. 7 illustrates that the GMCH 720 may be coupled to a memory 740 that may be, for example, a dynamic random access memory (DRAM). The DRAM may, for at least one embodiment, be associated with a non-volatile cache.

The GMCH 720 may be a chipset, or a portion of a chipset. The GMCH 720 may communicate with the processor(s) 710, 715 and control interaction between the processor(s) 710, 715 and memory 740. The GMCH 720 may also act as an accelerated bus interface between the processor(s) 710, 715 and other elements of the system 700. For at least one embodiment, the GMCH 720 communicates with the processor(s) 710, 715 via a multi-drop bus, such as a frontside bus (FSB) 795.

Furthermore, GMCH 720 is coupled to a display 745 (such as a flat panel or touchscreen display). GMCH 720 may include an integrated graphics accelerator. GMCH 720 is further coupled to an input/output (I/O) controller hub (ICH) 750, which may be used to couple various peripheral devices to system 700. Shown for example in the embodiment of FIG. 7 is an external graphics device 760, which may be a discrete graphics device coupled to ICH 750, along with another peripheral device 770.

Alternatively, additional or different processors may also be present in the system 700. For example, additional processor(s) 715 may include additional processors(s) that are the same as processor 710, additional processor(s) that are heterogeneous or asymmetric to processor 710, accelerators (such as, e.g., graphics accelerators or digital signal processing (DSP) units), field programmable gate arrays, or any other processor. There can be a variety of differences between the processor(s) 710, 715 in terms of a spectrum of metrics of merit including architectural, micro-architectural thermal, power consumption characteristics, and the like. These differences may effectively manifest themselves as asymmetry and heterogeneity amongst the processors 710, 715. For at least one embodiment, the various processors 710, 715 may reside in the same die package.

Figure 8:
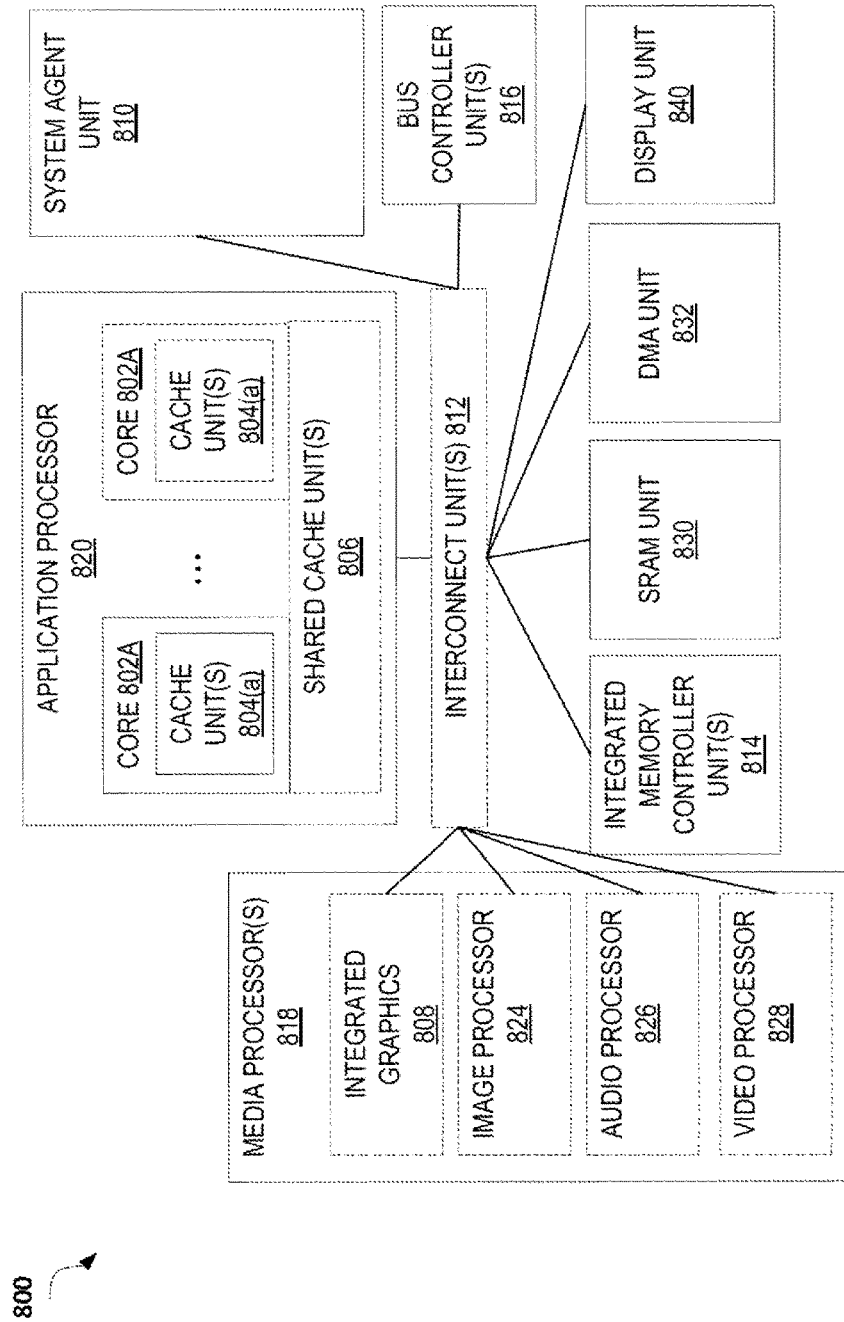
FIG. 8 is a block diagram of a system on chip (SoC) in accordance with an embodiment of the present disclosure.

Embodiments may be implemented in many different system types. FIG. 8 is a block diagram of a SoC 800 in accordance with an embodiment of the present disclosure. Dashed lined boxes are optional features on more advanced SoCs. In FIG. 8, an interconnect unit(s) 812 is coupled to: an application processor 820 which includes a set of one or more cores 802A-N and shared cache unit(s) 806; a system agent unit 810; a bus controller unit(s) 816; an integrated memory controller unit(s) 814; a set or one or more media processors 818 which may include integrated graphics logic 808, an image processor 824 for providing still and/or video camera functionality, an audio processor 826 for providing hardware audio acceleration, and a video processor 828 for providing video encode/decode acceleration; an static random access memory (SRAM) unit 830; a direct memory access (DMA) unit 832; and a display unit 840 for coupling to one or more external displays. In one embodiment, a memory module may be included in the integrated memory controller unit(s) 814. In another embodiment, the memory module may be included in one or more other components of the SoC 800 that may be used to access and/or control a memory. The application processor 820 may include an execution mode and transactional memory execution logic as described in embodiments herein.

The memory hierarchy includes one or more levels of cache within the cores, a set or one or more shared cache units 806, and external memory (not shown) coupled to the set of integrated memory controller units 814. The set of shared cache units 806 may include one or more mid-level caches, such as level 2 (L2), level 3 (L3), level 4 (L4), or other levels of cache, a last level cache (LLC), and/or combinations thereof.

In some embodiments, one or more of the cores 802A-N are capable of multithreading.

The system agent 810 includes those components coordinating and operating cores 802A-N. The system agent unit 810 may include for example a power control unit (PCU) and a display unit. The PCU may be or include logic and components needed for regulating the power state of the cores 802A-N and the integrated graphics logic 808. The display unit is for driving one or more externally connected displays.

The cores 802A-N may be homogenous or heterogeneous in terms of architecture and/or instruction set. For example, some of the cores 802A-N may be in order while others are out-of-order. As another example, two or more of the cores 802A-N may be capable of execution the same instruction set, while others may be capable of executing only a subset of that instruction set or a different instruction set.

The application processor 820 may be a general-purpose processor, such as a Core™ i3, i5, i7, 2 Duo and Quad, Xeon™, Itanium™, XScale™ or StrongARM™ processor, which are available from Intel™ Corporation, of Santa Clara, Calif. Alternatively, the application processor 820 may be from another company, such as ARM Holdings™, Ltd, MIPS™, etc. The application processor 820 may be a special-purpose processor, such as, for example, a network or communication processor, compression engine, graphics processor, co-processor, embedded processor, or the like. The application processor 820 may be implemented on one or more chips. The application processor 820 may be a part of and/or may be implemented on one or more substrates using any of a number of process technologies, such as, for example, BiCMOS, CMOS, or NMOS.

Figure 9:
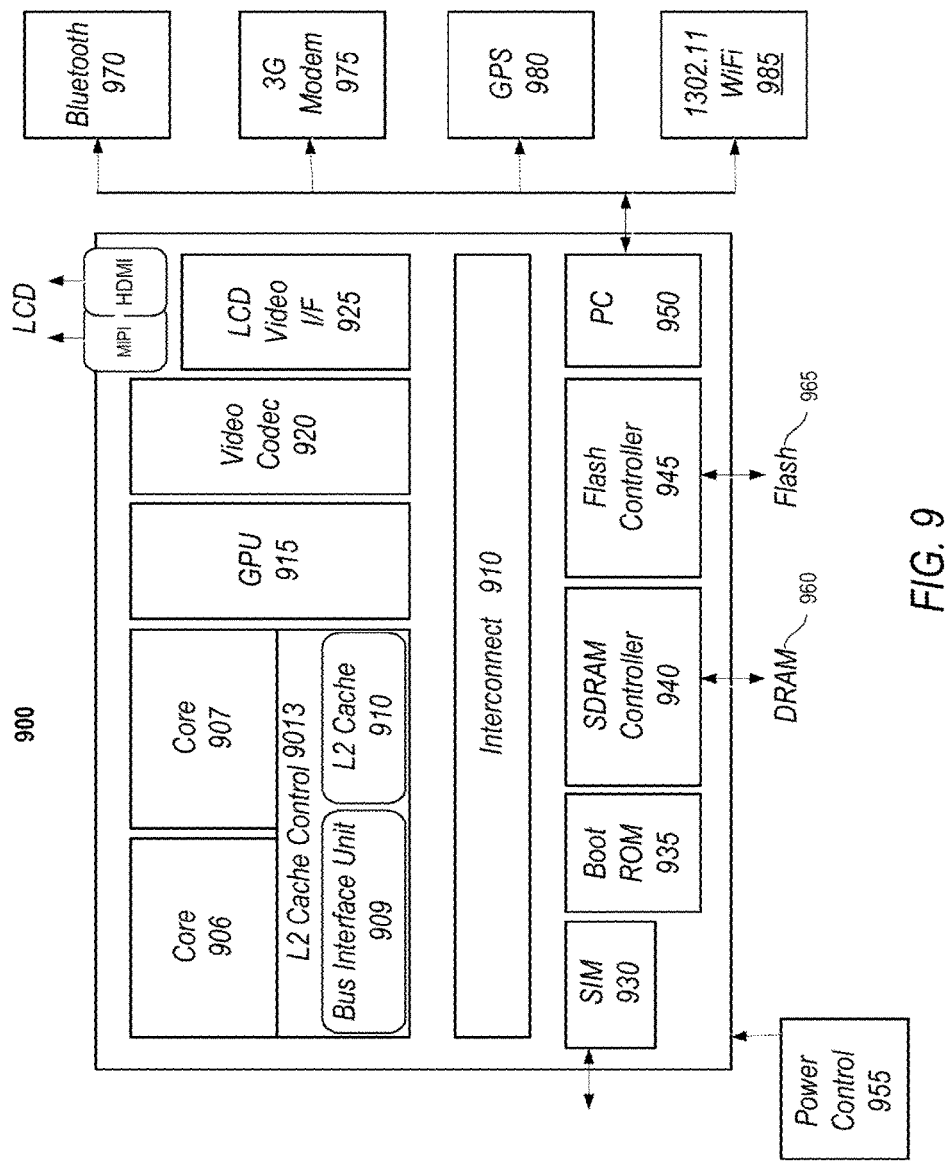
FIG. 9 is a block diagram of an embodiment of a system on-chip (SOC) design.

FIG. 9 is a block diagram of an embodiment of a system on-chip (SoC) design in accordance with the present disclosure. As a specific illustrative example, SoC 900 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1300 includes 2 cores—906 and 907. Cores 906 and 907 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 906 and 907 are coupled to cache control 908 that is associated with bus interface unit 909 and L2 cache 910 to communicate with other parts of system 900. Interconnect 910 includes an on-chip interconnect, such as an IOSF, AMBA, or other interconnect discussed above, which potentially implements one or more aspects of the described disclosure. In one embodiment, an execution mode and transactional memory execution logic may be included in cores 906, 907.

Interconnect 910 provides communication channels to the other components, such as a Subscriber Identity Module (SIM) 930 to interface with a SIM card, a boot ROM 935 to hold boot code for execution by cores 906 and 907 to initialize and boot SoC 900, a SDRAM controller 940 to interface with external memory (e.g. DRAM 960), a flash controller 945 to interface with non-volatile memory (e.g. Flash 965), a peripheral control 950 (e.g. Serial Peripheral Interface) to interface with peripherals, video codecs 920 and Video interface 925 to display and receive input (e.g. touch enabled input), GPU 915 to perform graphics related computations, etc. Any of these interfaces may incorporate aspects of the disclosure described herein. In addition, the system 900 illustrates peripherals for communication, such as a Bluetooth module 970, 3G modem 975, GPS 980, and Wi-Fi 985.

Figure 10:
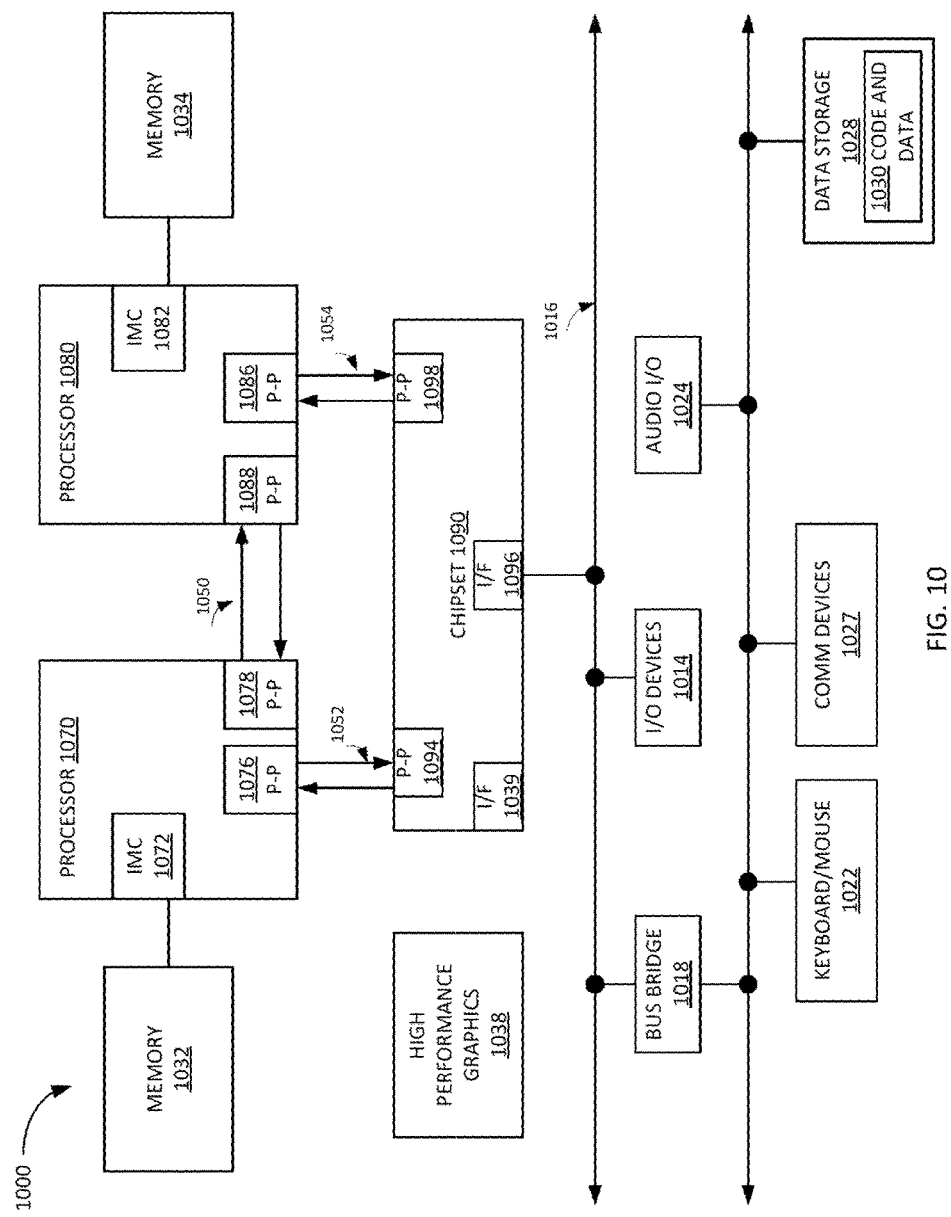
FIG. 10 illustrates a block diagram of a computer system according to one embodiment.

Referring now to FIG. 10, shown is a block diagram of a system 1000 in accordance with an embodiment of the invention. As shown in FIG. 10, multiprocessor system 1000 is a point-to-point interconnect system, and includes a first processor 1070 and a second processor 1080 coupled via a point-to-point interconnect 1050. Each of processors 1070 and 1080 may be some version of the processors of the computing systems as described herein. In one embodiment, processors 1070, 1080 track execution mode and transactional memory execution in an instruction trace system.

While shown with two processors 1070, 1080, it is to be understood that the scope of the disclosure is not so limited. In other embodiments, one or more additional processors may be present in a given processor.

Processors 1070 and 1080 are shown including integrated memory controller units 1072 and 1082, respectively. Processor 1070 also includes as part of its bus controller units point-to-point (P-P) interfaces 1076 and 1078; similarly, second processor 1080 includes P-P interfaces 1086 and 1088. Processors 1070, 1080 may exchange information via a point-to-point (P-P) interface 1050 using P-P interface circuits 1078, 1088. As shown in FIG. 10, IMCs 1072 and 1082 couple the processors to respective memories, namely a memory 1032 and a memory 1034, which may be portions of main memory locally attached to the respective processors.

Processors 1070 and 1080 may each exchange information with a chipset 1090 via individual P-P interfaces 1052, 1054 using point to point interface circuits 1076, 1094, 1086, 1098. Chipset 1090 may also exchange information with a high-performance graphics circuit 1038 via a high-performance graphics interface 1039.

A shared cache (not shown) may be included in either processor or outside of both processors, yet connected with the processors via P-P interconnect, such that either or both processors' local cache information may be stored in the shared cache if a processor is placed into a low power mode.

Chipset 1090 may be coupled to a first bus 1016 via an interface 1096. In one embodiment, first bus 1016 may be a Peripheral Component Interconnect (PCI) bus, or a bus such as a PCI Express bus or another third generation I/O interconnect bus, although the scope of the disclosure is not so limited.

As shown in FIG. 10, various I/O devices 1014 may be coupled to first bus 1016, along with a bus bridge 1018, which couples first bus 1016 to a second bus 1020. In one embodiment, second bus 1020 may be a low pin count (LPC) bus. Various devices may be coupled to second bus 1020 including, for example, a keyboard and/or mouse 1022, communication devices 1027 and a storage unit 1028 such as a disk drive or other mass storage device which may include instructions/code and data 1030, in one embodiment. Further, an audio I/O 1024 may be coupled to second bus 1020. Note that other architectures are possible. For example, instead of the point-to-point architecture of FIG. 10, a system may implement a multi-drop bus or other such architecture.

Figure 11:
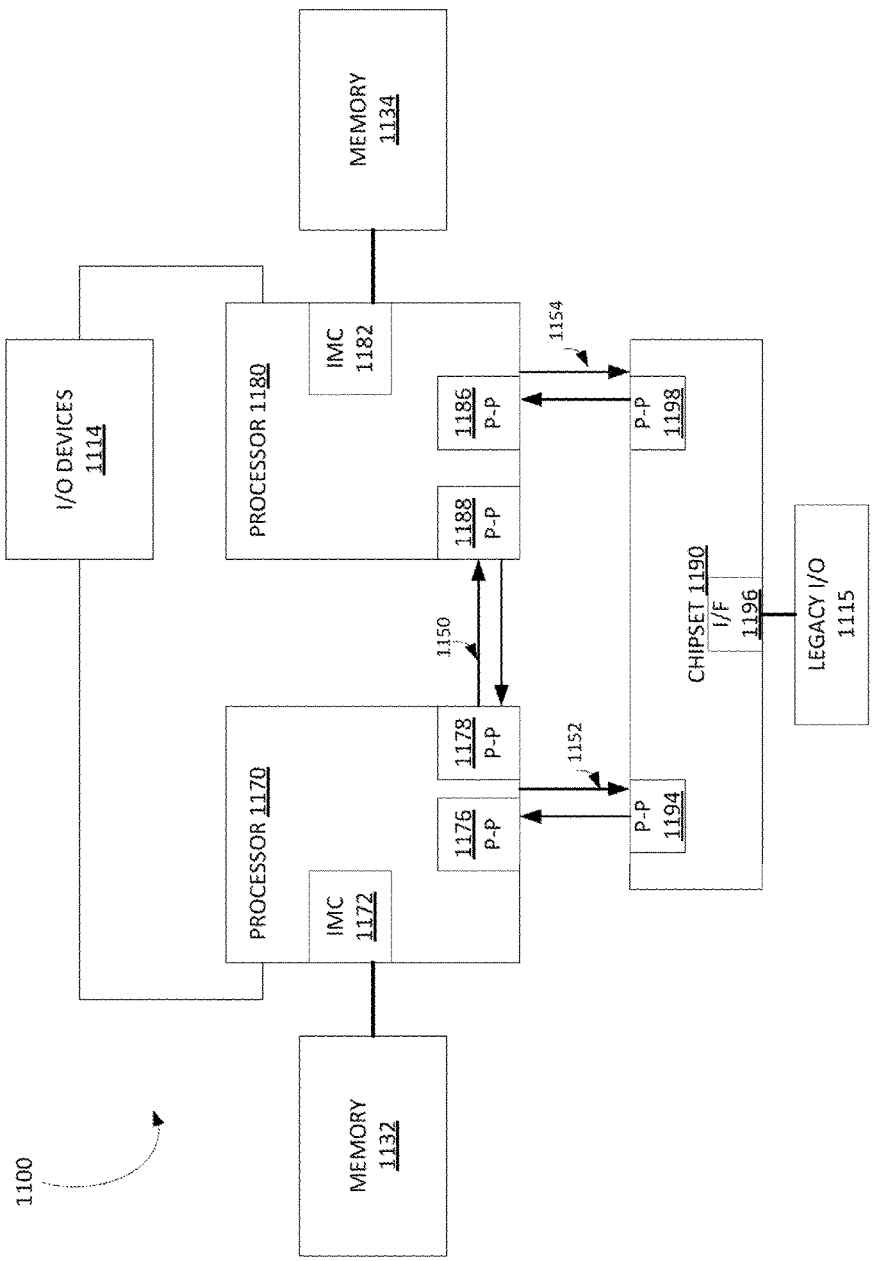
FIG. 11 illustrates a block diagram of a computer system according to one embodiment.

Referring now to FIG. 11, shown is a block diagram of a system 1100 in accordance with an embodiment of the invention. FIG. 11 illustrates processors 1170, 1180. In one embodiment, processors 1170, 1180 track execution mode and transactional memory execution in an instruction trace system. Furthermore, processors 1170, 1180 may include integrated memory and I/O control logic ("CL") 1172 and 1182, respectively and intercommunicate with each other via point-to-point interconnect 1150 between point-to-point (P-P) interfaces 1178 and 1188 respectively. Processors 1170, 1180 each communicate with chipset 1190 via point-to-point interconnect 1152 and 1154 through the respective P-P interfaces 1176 to 1194 and 1186 to 1198 as shown. For at least one embodiment, the CL 1172, 1182 may include integrated memory controller units. CLs 1172, 1182 may include I/O control logic. As depicted, memories 1132, 1134 coupled to CLs 1172, 1182 and I/O devices 1114 are also coupled to the control logic 1172, 1182. Legacy I/O devices 1115 are coupled to the chipset 1190 via interface 1196.

Figure 12:
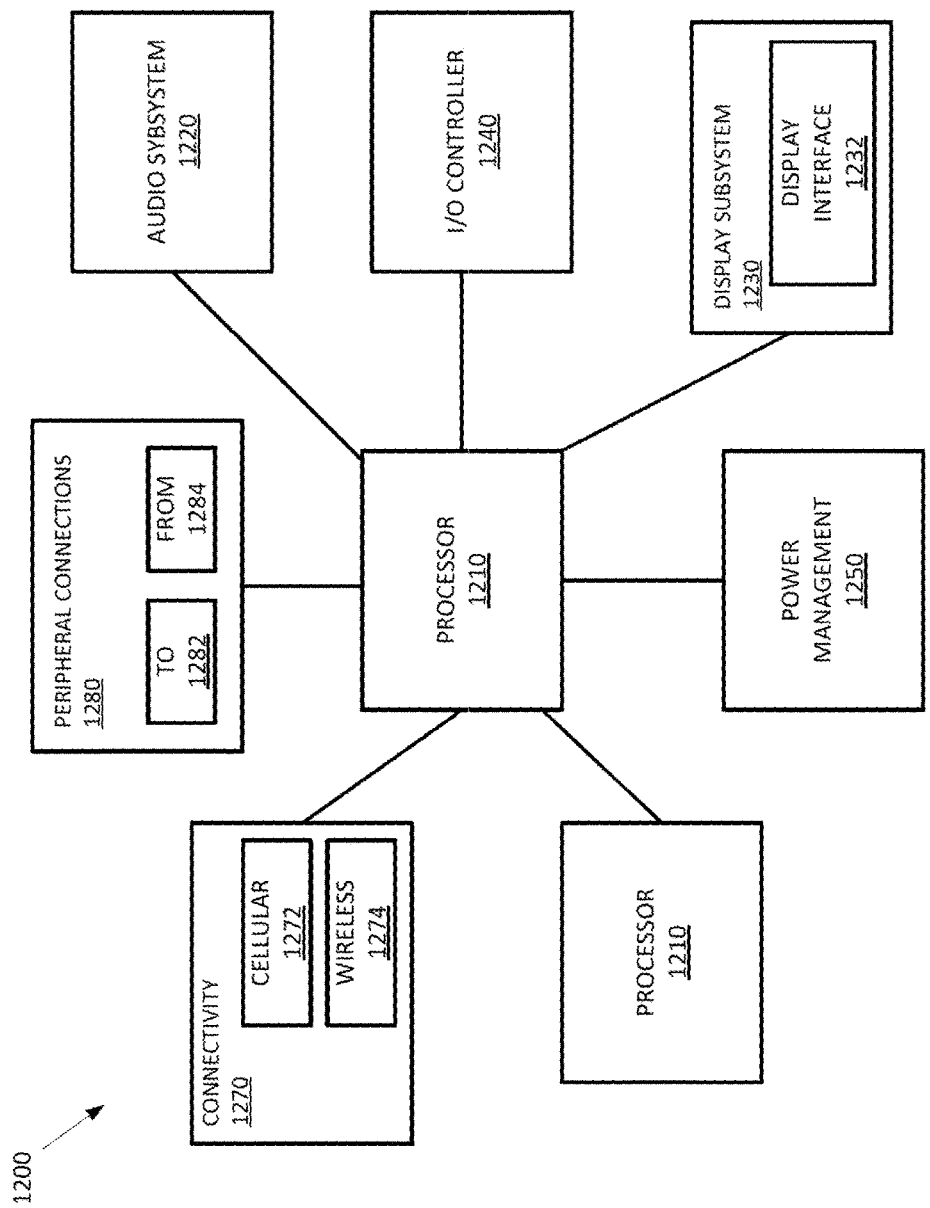
FIG. 12 illustrates block diagram of an embodiment of tablet computing device, a smartphone, or other mobile device in which touchscreen interface connectors are used.

FIG. 12 illustrates a block diagram 1200 of an embodiment of tablet computing device, a smartphone, or other mobile device in which touchscreen interface connectors may be used. Processor 1210 may track execution mode and transactional memory execution in an instruction trace system. In addition, processor 1210 performs the primary processing operations. Audio subsystem 1220 represents hardware (e.g., audio hardware and audio circuits) and software (e.g., drivers, codecs) components associated with providing audio functions to the computing device. In one embodiment, a user interacts with the tablet computing device or smartphone by providing audio commands that are received and processed by processor 1210.

Display subsystem 1230 represents hardware (e.g., display devices) and software (e.g., drivers) components that provide a visual and/or tactile display for a user to interact with the tablet computing device or smartphone. Display subsystem 1230 includes display interface 1232, which includes the particular screen or hardware device used to provide a display to a user. In one embodiment, display subsystem 1230 includes a touchscreen device that provides both output and input to a user.

I/O controller 1240 represents hardware devices and software components related to interaction with a user. I/O controller 1240 can operate to manage hardware that is part of audio subsystem 1220 and/or display subsystem 1230. Additionally, I/O controller 1240 illustrates a connection point for additional devices that connect to the tablet computing device or smartphone through which a user might interact. In one embodiment, I/O controller 1240 manages devices such as accelerometers, cameras, light sensors or other environmental sensors, or other hardware that can be included in the tablet computing device or smartphone. The input can be part of direct user interaction, as well as providing environmental input to the tablet computing device or smartphone.

In one embodiment, the tablet computing device or smartphone includes power management 1250 that manages battery power usage, charging of the battery, and features related to power saving operation. Memory subsystem 1260 includes memory devices for storing information in the tablet computing device or smartphone. Connectivity 1270 includes hardware devices (e.g., wireless and/or wired connectors and communication hardware) and software components (e.g., drivers, protocol stacks) to the tablet computing device or smartphone to communicate with external devices. Cellular connectivity 1272 may include, for example, wireless carriers such as GSM (global system for mobile communications), CDMA (code division multiple access), TDM (time division multiplexing), or other cellular service standards). Wireless connectivity 1274 may include, for example, activity that is not cellular, such as personal area networks (e.g., Bluetooth), local area networks (e.g., WiFi), and/or wide area networks (e.g., WiMax), or other wireless communication.

Peripheral connections 1280 include hardware interfaces and connectors, as well as software components (e.g., drivers, protocol stacks) to make peripheral connections as a peripheral device ("to" 1282) to other computing devices, as well as have peripheral devices ("from" 1284) connected to the tablet computing device or smartphone, including, for example, a "docking" connector to connect with other computing devices. Peripheral connections 1280 include common or standards-based connectors, such as a Universal Serial Bus (USB) connector, DisplayPort including MiniDisplayPort (MDP), High Definition Multimedia Interface (HDMI), Firewire, etc.

Figure 13:
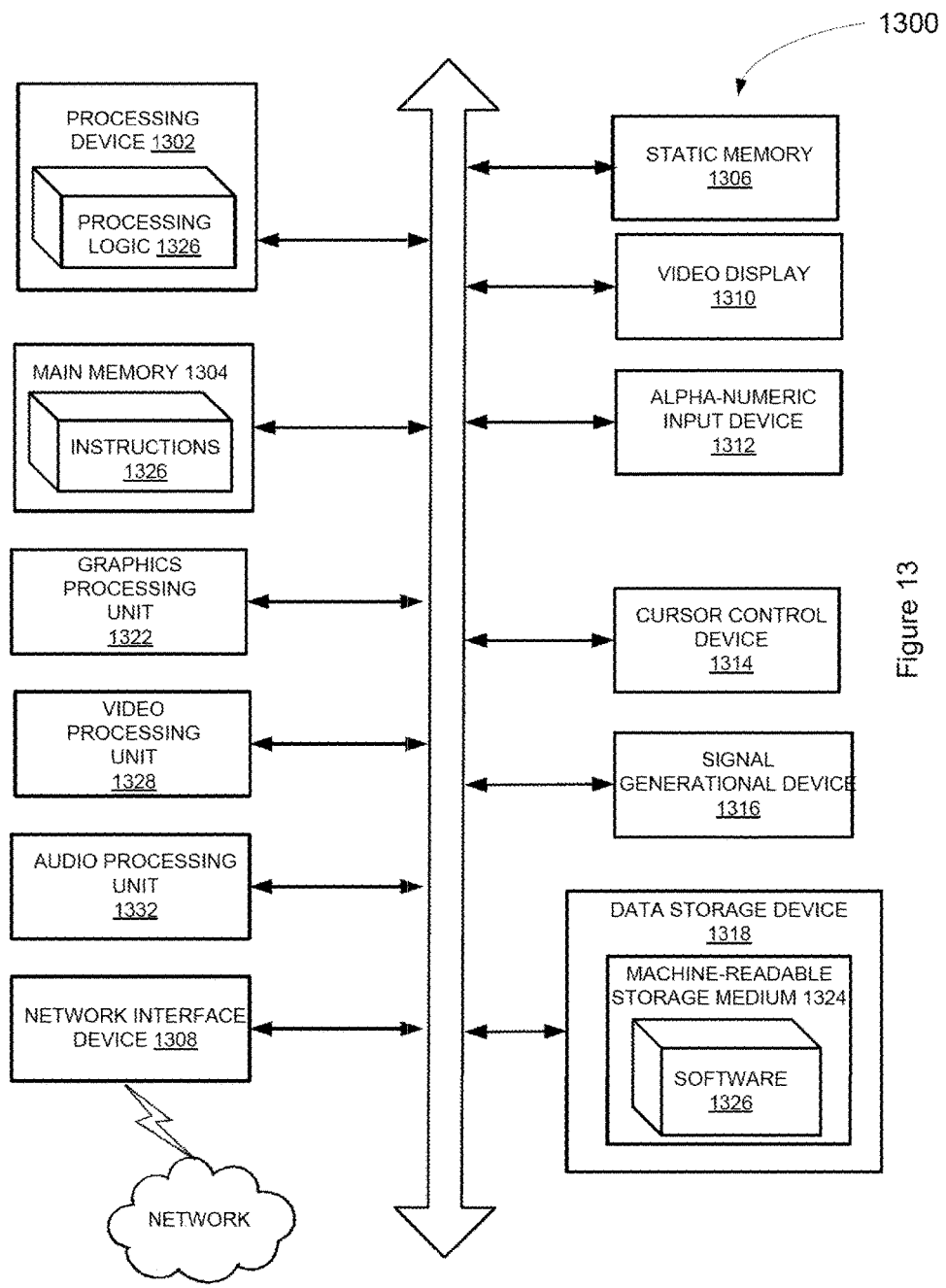
FIG. 13 illustrates a diagrammatic representation of a machine in the example form of a computer system within which a set of instructions, for causing the machine to perform any one or more of the methodologies discussed herein, may be executed.

FIG. 13 illustrates a diagrammatic representation of a machine in the example form of a computing system 1300 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computing system 1300 includes a processing device 1302, a main memory 1304 (e.g., read-only memory (ROM), flash memory, dynamic random access memory (DRAM) (such as synchronous DRAM (SDRAM) or DRAM (RDRAM), etc.), a static memory 1306 (e.g., flash memory, static random access memory (SRAM), etc.), and a data storage device 1318, which communicate with each other via a bus 1330.

Processing device 1302 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1302 may also be one or more special-purpose processing devices such as an application specific integrated circuit (ASIC), a field programmable gate array (FPGA), a digital signal processor (DSP), network processor, or the like. In one embodiment, processing device 1302 may include one or processing cores. The processing device 1302 is configured to execute the processing logic 1326 for performing the operations discussed herein. In one embodiment, processing device 1302 is the same as processing device 100 described with respect to FIG. 1A that implements the instruction trace module 103 and scheduler and execution unit 102. Alternatively, the computing system 1300 can include other components as described herein.

The computing system 1300 may further include a network interface device 1308 communicably coupled to a network 1320. The computing system 1300 also may include a video display unit 1310 (e.g., a liquid crystal display (LCD) or a cathode ray tube (CRT)), an alphanumeric input device 1312 (e.g., a keyboard), a cursor control device 1314 (e.g., a mouse), a signal generation device 1316 (e.g., a speaker), or other peripheral devices. Furthermore, computing system 1300 may include a graphics processing unit 1322, a video processing unit 1328 and an audio processing unit 1332. In another embodiment, the computing system 1300 may include a chipset (not illustrated), which refers to a group of integrated circuits, or chips, that are designed to work with the processing device 1302 and controls communications between the processing device 1302 and external devices. For example, the chipset may be a set of chips on a motherboard that links the processing device 1302 to very high-speed devices, such as main memory 1304 and graphic controllers, as well as linking the processing device 1302 to lower-speed peripheral buses of peripherals, such as USB, PCI or ISA buses.

The data storage device 1318 may include a computer-readable storage medium 1324 on which is stored software 1326 embodying any one or more of the methodologies of functions described herein. The software 1326 may also reside, completely or at least partially, within the main memory 1304 as instructions 1326 and/or within the processing device 1302 as processing logic 1326 during execution thereof by the computing system 1300; the main memory 1304 and the processing device 1302 also constituting computer-readable storage media.

The computer-readable storage medium 1324 may also be used to store instructions 1326 utilizing the real time instruction trace component 103 and the scheduler and execution unit 102, such as described with respect to FIG. 1, and/or a software library containing methods that call the above applications. While the computer-readable storage medium 1324 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the embodiments. The term "computer-readable storage medium" shall accordingly be taken to include, but not be limited to, solid-state memories, and optical and magnetic media. While the invention has been described with respect to a limited number of embodiments, those skilled in the art will appreciate numerous modifications and variations therefrom. It is intended that the appended claims cover all such modifications and variations as fall within the true spirit and scope of this invention.

The following examples pertain to further embodiments. Example 1 is a processing device tracking mode of a processing device in an instruction tracing system comprising an instruction tracing (IT) module to receive an indication of a change in a current execution mode of the processing device, determine that the current execution mode of the received indication is different than a value of an execution mode of a first execution mode (EM) packet previously-generated by the IT module and generate, based on determining that the current execution mode is different, a second EM packet that provides a value of the current execution mode of the processing device to indicate the change in the execution mode for an instruction in a trace generated by the IT module.

In Example 2, the subject matter of Example 1 can optionally include wherein the IT module to generate an execution mode instruction pointer (EMIP) packet associated with the second EM packet, wherein the EMIP packet identifies an instruction pointer (IP) of a next instruction to be executed in the trace in the current execution mode, wherein the EMIP packet identifies the IP of a first instruction to be executed in the trace in the current execution mode when the second EM packet provides the indication of the change in the execution mode of the processor.

In Example 3, the subject matter of any of Examples 1-2 can optionally include wherein the IT module to generate transactional memory (TMX) packets comprising a n bit mode pattern in the packet log, wherein the n is at least two, wherein the n bit mode indicates transaction status of the TMX operation. In Example 4, the subject matter of any of Examples 1-3 can optionally include wherein the transaction status of the TMX operation associated with a bit of the n bit mode pattern comprises an abort of the TMX operation. In Example 5, the subject matter of any of Examples 1-4 can optionally include wherein the transaction status of the TMX operation associated with a bit of the n bit mode pattern comprises commit of the TMX operation.

In Example 6, the subject matter of any of Examples 1-5 can optionally include wherein the IT module to generate a source transactional memory instruction pointer (STMXIP) packet associated with the TMX packet, wherein when the associated TMX packet indicates a change in transaction status, the STMXIP packet identifies an instruction pointer (IP) of a last instruction to be executed in a former transaction status, wherein the former transaction status is prior to the changed transaction status.

In Example 7, the subject matter of any of Examples 1-6 can optionally include wherein the IT module to generate a source transactional memory instruction pointer (STMXIP) packet associated with the TMX packet, wherein when the associated TMX packet indicates a change in transaction status, the STMXIP packet identifies an instruction pointer (IP) of next instruction to be executed in the former transaction status, wherein the former transaction status is prior to the changed transaction status.

In Example 8, the subject matter of any of Examples 1-7 can optionally include wherein the IT module to generate a source transactional memory instruction pointer (STMXIP) packet associated with the TMX packet, wherein when the associated TMX packet indicates a change in transaction status, the STMXIP packet identifies an instruction pointer (IP) of a first instruction to be executed in the changed transaction status, wherein the former transaction status is prior to the changed transaction status.

In Example 9, the subject matter of any of Examples 1-8 can optionally include wherein the IT module generate a target transactional memory instruction pointer (TTMXIP) packet associated with the TMX packet, the TTMXIP packet provides an instruction pointer (IP) of a next instruction to be executed after the abort of the TMX operation.

Example 10 is a system tracking mode of a processing device in an instruction tracing system. In Example 10, the system includes a memory and a processing device communicably coupled to the memory, the processing device comprising a scheduler and execution unit and a retirement unit communicably coupled to the scheduler and execution unit. Further to Example 10, the retirement unit comprising an instruction tracing module to generate transactional memory (TMX) packets comprising a n bit mode pattern in the packet log, wherein the n is at least two, wherein the n bit mode indicates transaction status of the TMX operation.

In Example 11, the subject matter of Example 10 can optionally include wherein the transaction status of the TMX operation associated with a bit of the n bit mode pattern comprises an abort of the TMX operation. In Example 12, the subject matter of any of Examples 10-11 can optionally include wherein the transaction status of the TMX operation associated with a bit of the n bit mode pattern comprises a commit of the TMX operation.

In Example 13, the subject matter of any of Examples 10-12 can optionally include wherein the IT module to generate a source transactional memory instruction pointer (STMXIP) packet associated with the TMX packet, wherein when the associated TMX packet indicates a change in transaction status, the STMXIP packet identifies an instruction pointer (IP) of a last instruction to be executed in a former transaction status, wherein the former transaction status is prior to the changed transaction status.

In Example 14, the subject matter of any of Examples 10-13 can optionally include wherein the IT module to generate a source transactional memory instruction pointer (STMXIP) packet associated with the TMX packet, wherein when the associated TMX packet indicates a change in transaction status, the STMXIP packet identifies an instruction pointer (IP) of next instruction to be executed in the former transaction status, wherein the former transaction status is prior to the changed transaction status.

In Example 15, the subject matter of any of Examples 10-14 can optionally include wherein the IT module to generate a source transactional memory instruction pointer (STMXIP) packet associated with the TMX packet, wherein when the associated TMX packet indicates a change in transaction status, the STMXIP packet identifies an instruction pointer (IP) of a first instruction to be executed in the changed transaction status, wherein the former transaction status is prior to the changed transaction status. In Example 16, the subject matter of any of Examples 10-15 can optionally include wherein the IT module to generate a target transactional memory instruction pointer (TTMXIP) packet associated with the TMX packet, wherein the TTMXIP packet provides an instruction pointer (IP) of a next instruction to be executed after the abort of the TMX operation.

In Example 17, the subject matter of any of Examples 10-16 can optionally include wherein the IT module to receive an indication of a change in a current execution mode of the processing device, determine that the current execution mode of the received indication is different than a value of an execution mode of a first execution mode (EM) packet previously-generated by the IT module and generate, based on determining that the current execution mode is different, a second EM packet that provides a value of the current execution mode of the processing device to indicate the change in the execution mode for an instruction in a trace generated by the IT module.

In Example 18, the subject matter of any of Examples 10-17 can optionally include wherein the IT module to generate an execution mode instruction pointer (EMIP) packet associated with the second EM packet, wherein the EMIP packet identifies an instruction pointer (IP) of a next instruction to be executed in the trace in the current execution mode, wherein the EMIP packet identifies the IP of a first instruction to be executed in the trace in the current execution mode when the second EM packet provides the indication of the change in the execution mode of the processor.

Example 19 is a method for tracking mode of a processing device in an instruction tracing system comprising receiving, by a processing device, an indication of a change in a current execution mode of the processing device, determining, by the processing device, that the current execution mode of the received indication is different than a value of an execution mode of a first execution mode (EM) packet previously-generated by the IT module and generating, based on the determining that the current execution mode is different, a second EM packet that provides a value of the current execution mode of the processing device to indicate the change in the execution mode for an instruction in a trace generated by the IT module.

In Example 20, the subject matter of Example 19 can optionally include further comprising generating an execution mode instruction pointer (EMIP) packet associated with the second EM packet, wherein the EMIP packet identifies an instruction pointer (IP) of a next instruction to be executed in the trace in the current execution mode, wherein the EMIP packet identifies the IP of a first instruction to be executed in the trace in the current execution mode when the second EM packet provides the indication of the change in the execution mode of the processor.

In Example 21, the subject matter of any of Examples 19-20 can optionally include generating transactional memory (TMX) packets comprising a n bit mode pattern in the packet log, wherein the n is at least two, wherein the n bit mode indicates transaction status of the TMX operation.

In Example 22, the subject matter of any of Examples 19-21 can optionally include wherein the transaction status of the TMX operation associated with a bit of the n bit mode pattern comprises an abort of the TMX operation. In Example 23, the subject matter of any of Examples 19-22 can optionally include wherein the transaction status of the TMX operation associated with a bit of the n bit mode pattern comprises a commit of the TMX operation.

In Example 24, the subject matter of any of Examples 19-23 can optionally include generating a source transactional memory instruction pointer (STMXIP) packet associated with the TMX packet, wherein when the associated TMX packet indicates a change in transaction status, the STMXIP packet identifies an instruction pointer (IP) of a last instruction to be executed in a former transaction status, wherein the former transaction status is prior to the changed transaction status.

In Example 25, the subject matter of any of Examples 19-24 can optionally include generating a source transactional memory instruction pointer (STMXIP) packet associated with the TMX packet, wherein when the associated TMX packet indicates a change in transaction status, the STMXIP packet identifies an instruction pointer (IP) of next instruction to be executed in the former transaction status, wherein the former transaction status is prior to the changed transaction status.

In Example 26, the subject matter of any of Examples 19-25 can optionally include generating a source transactional memory instruction pointer (STMXIP) packet associated with the TMX packet, wherein when the associated TMX packet indicates a change in transaction status, the STMXIP packet identifies an instruction pointer (IP) of a first instruction to be executed in the changed transaction status, wherein the former transaction status is prior to the changed transaction status.

In Example 27, the subject matter of any of Examples 19-26 can optionally include generating a target transactional memory instruction pointer (TTMXIP) packet associated with the TMX packet, wherein the TTMXIP packet provides an instruction pointer (IP) of a next instruction to be executed after the abort of the TMX operation.

Example 28 is non-transitory computer-readable medium for tracking mode of a processing device in an instruction tracing system. In Example 28, the non-transitory computer-readable medium includes data that, when accessed by a processing device, cause the processing device to perform operations comprising generating transactional memory (TMX) packets comprising a n bit mode pattern in the packet log, wherein the n is at least two, wherein the n bit mode indicates transaction status of the TMX operation.

In Example 29, the subject matter of Example 28 can optionally include wherein the transaction status of the TMX operation associated with a bit of the n bit mode pattern comprises an abort of the TMX operation. In Example 30, the subject matter of Examples 28-29 can optionally include wherein the transaction status of the TMX operation associated with a bit of the n bit mode pattern comprises a commit of the TMX operation.

In Example 31, the subject matter of any of Examples 28-30 can optionally include wherein the operations further comprising generating a source transactional memory instruction pointer (STMXIP) packet associated with the TMX packet, wherein when the associated TMX packet indicates a change in transaction status, the STMXIP packet identifies an instruction pointer (IP) of a last instruction to be executed in a former transaction status, wherein the former transaction status is prior to the changed transaction status.

In Example 32, the subject matter of any of Examples 28-31 can optionally include wherein the operations further comprising generating a source transactional memory instruction pointer (STMXIP) packet associated with the TMX packet, wherein when the associated TMX packet indicates a change in transaction status, the STMXIP packet identifies an instruction pointer (IP) of next instruction to be executed in the former transaction status, wherein the former transaction status is prior to the changed transaction status.

In Example 33, the subject matter of any of Examples 28-32 can optionally include wherein the operations further comprising generating a source transactional memory instruction pointer (STMXIP) packet associated with the TMX packet, wherein when the associated TMX packet indicates a change in transaction status, the STMXIP packet identifies an instruction pointer (IP) of a first instruction to be executed in the changed transaction status, wherein the former transaction status is prior to the changed transaction status.

In Example 34, the subject matter of any of Examples 28-33 can optionally include wherein the operations further comprising generating a target transactional memory instruction pointer (TTMXIP) packet associated with the TMX packet, wherein the TTMXIP packet provides an instruction pointer (IP) of a next instruction to be executed after the abort of the TMX operation.

In Example 35, the subject matter of any of Examples 28-34 can optionally include wherein the operations further comprising receiving an indication of a change in a current execution mode of the processing device, determining that the current execution mode of the received indication is different than a value of an execution mode of a first execution mode (EM) packet previously-generated by the IT module and generating, based on the determining that the current execution mode is different, a second EM packet that provides a value of the current execution mode of the processing device to indicate the change in the execution mode for an instruction in a trace generated by the IT module.

In Example 36, the subject matter of any of Examples 28-35 can optionally include wherein the operations further comprising generating an execution mode instruction pointer (EMIP) packet associated with the second EM packet, wherein the EMIP packet identifies an instruction pointer (IP) of a next instruction to be executed in the trace in the current execution mode, wherein the EMIP packet identifies the IP of a first instruction to be executed in the trace in the current execution mode when the second EM packet provides the indication of the change in the execution mode of the processor.

Example 37 is an apparatus for tracking mode of a processing device in an instruction tracing system comprising means for receiving an indication of a change in a current execution mode of the processing device, determining that the current execution mode of the received indication is different than a value of an execution mode of a first execution mode (EM) packet previously-generated by the IT module and generating, based on the determining that the current execution mode is different, a second EM packet that provides a value of the current execution mode of the processing device to indicate the change in the execution mode for an instruction in a trace generated by the IT module.

In Example 38, the subject matter of Example 37 can optionally include the apparatus further configured to perform the method of any one of the Examples 20-27.

Example 39 is at least one machine readable medium comprising a plurality of instructions that in response to being executed on a computing device, cause the computing device to carry out a method according to any one of Examples 19-27. Example 40 is an apparatus for tracking mode of a processing device in an instruction tracing system to perform the method of any one of Examples 19-27. Example 41 is an apparatus for tracking mode of a processing device in an instruction tracing system comprising means for performing the method of any one of Examples 19-27. Specifics in the Examples may be used anywhere in one or more embodiments.

Various embodiments may have different combinations of the structural features described above. For instance, all optional features of the SOC described above may also be implemented with respect to a processor described herein and specifics in the examples may be used anywhere in one or more embodiments.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1110 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element.

A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processing device comprising:
   a scheduler and execution unit circuitry to execute program instructions in at least a first execution mode and a second execution mode, wherein the first execution mode is an X-bit execution mode, and the second execution mode is a Y-bit execution mode; and a retirement unit communicably coupled to the scheduler and execution unit circuitry, wherein the retirement unit is to:
trace the program instructions executed by the scheduler and execution unit circuitry in the first execution mode;
while the program instructions are executed in the first execution mode, determine a mode changing instruction has been executed to perform a change from the first execution mode of the scheduler and execution unit circuitry to the second execution mode;
in response to the mode changing instruction, generate an execution mode (EM) packet to indicate the change from the first execution mode to the second execution mode;
generate an execution mode instruction pointer (EMIP) packet associated with the EM packet, wherein the EMIP packet identifies a first instruction pointer (IP) of a first instruction to be executed in the second execution mode in response to the EM packet providing the indication of the change from the first execution mode to the second execution mode;
generate transactional memory (TMX) packets comprising an n-bit mode pattern in a packet log, wherein the n is at least two, and wherein the n-bit mode indicates a status of a TMX operation of the program instructions; and
output the EM packet in the packet log.

2. The processing device of claim 1, wherein the status of the TMX operation is associated with a bit of the n-bit mode pattern, wherein the status comprises one of an abort of the TMX operation or a commit of the TMX operation.

3. The processing device of claim 2, wherein the retirement unit is to further generate a source transactional memory instruction pointer (STMXIP) packet associated with the TMX packet, wherein in response to the associated TMX packet indicating a change in the status, the STMXIP packet identifies one of:
a second IP of a last instruction to be executed in a former status;
a third IP of a next instruction to be executed in the former status; or
a fourth IP of a second instruction to be executed in a changed status, wherein the former status is prior to the changed status.

4. The processing device of claim 2, wherein the retirement unit is to further generate a target transactional memory instruction pointer (TTMXIP) packet associated with the TMX packet, wherein the TTMXIP packet provides a fifth IP of a next instruction to be executed after the abort of the TMX operation.

5. A system comprising:
a memory; and
a processing device communicably coupled to the memory, wherein the processing device comprises:
a scheduler and execution unit circuitry to execute program instructions in at least a first execution mode and a second execution mode, wherein the first execution mode is an X-bit execution mode, and the second execution mode is a Y-bit execution mode; and
a retirement unit communicably coupled to the scheduler and execution unit, wherein the retirement unit is to:
trace a transactional memory (TMX) operation of the program instructions associated with the first execution mode;
while the program instructions are executed in the first execution mode, determine a mode changing instruction has been executed to perform a change from the first execution mode of the scheduler and execution unit circuitry to the second execution mode;
in response to the mode changing instruction, generate an execution mode (EM) packet to indicate the change from the first execution mode to the second execution mode;
generate an execution mode instruction pointer (EMIP) packet associated with the EM packet, wherein the EMIP packet identifies a first instruction pointer (IP) of a first instruction to be executed in the second execution mode in response to the EM packet providing the indication of the change from the first execution mode to the second execution mode; and
generate a TMX packet comprising an n-bit mode pattern in a packet log, wherein the n is at least two, wherein the n-bit mode indicates an execution mode status associated with the TMX operation.

6. The system of claim 5, wherein the execution mode status associated with the TMX operation is associated with a bit of the n-bit mode pattern, wherein the execution mode status comprises one of an abort of the TMX operation or a commit of the TMX operation.

7. The system of claim 6, wherein the retirement unit is to generate a source transactional memory instruction pointer (STMXIP) packet associated with the TMX packet, wherein in response to the associated TMX packet indicating a change in the execution mode status, the STMXIP packet identifies one of:
a second IP of a last instruction to be executed in a former status;
a third IP of a next instruction to be executed in the former status; or
a fourth IP of a second instruction to be executed in a changed status, wherein the former status is prior to the changed status.

8. The system of claim 6, wherein the retirement unit is to further generate a target transactional memory instruction pointer (TTMXIP) packet associated with the TMX packet, wherein the TTMXIP packet provides a fifth IP of a next instruction to be executed after the abort of the TMX operation.

9. A method comprising:
tracing program instructions executed by a processing device, wherein the processing device executes the program instructions at least a first execution mode and a second execution mode, wherein the first execution mode is an X-bit execution mode, and the second execution mode is a Y-bit execution mode;
while the program instructions are executed in the first execution mode, determining a mode changing instruction has been executed to perform a change from the first execution mode of the processing device to the second execution mode;
in response to the mode changing instruction, generating an execution mode (EM) packet to indicate the change in the first execution mode of the processing device to the second execution mode;
generating an execution mode instruction pointer (EMIP) packet associated with the EM packet, wherein the EMIP packet identifies a first instruction pointer (IP) of a first instruction to be executed in the second execution mode in response to the EM packet providing the indication of the change from the first execution mode to the second execution mode;

generating transactional memory (TMX) packets comprising an n-bit mode pattern in a packet log, wherein the n is at least two, and wherein the n-bit mode indicates a status of a TMX operation of the program instructions; and outputting the EM packet in the packet log.

10. The method of claim 9, wherein the status of the TMX operation associated with a bit of the n-bit mode pattern comprises one of an abort of the TMX operation or a commit of the TMX operation.

11. The method of claim 10 further comprising generating a source transactional memory instruction pointer (STMXIP) packet associated with the TMX packet, wherein in response to the associated TMX packet indicating a change in the status, the STMXIP packet identifies one of:

a second IP of a last instruction to be executed in a former status;

a third IP of next instruction to be executed in the former status; or a fourth IP of a second instruction to be executed in a changed status, wherein the former status is prior to the changed status.

12. The method of claim 10 further comprising generating a target transactional memory instruction pointer (TTMXIP) packet associated with the TMX packet, wherein the TTMXIP packet provides a fifth IP of a next instruction to be executed after the abort of the TMX operation.

13. A non-transitory machine-readable storage medium including data that, when accessed by a processing device, cause the processing device to perform operations comprising:

tracing a transactional memory (TMX) operation of program instructions, wherein the program instructions are executed in at least a first execution mode and a second execution mode, wherein the first execution mode is an X-bit execution mode, and the second execution mode is a Y-bit execution mode;

while the program instructions are executed in the first mode, determine a mode changing instruction has been executed to perform a change from the first execution mode to the second execution mode;

in response to the mode changing instruction, generate an execution mode (EM) packet to indicate the change from the first execution mode to the second execution mode;

generating an execution mode instruction pointer (EMIP) packet associated with the EM packet, wherein the EMIP packet identifies a first instruction pointer (IP) of a first instruction to be executed in the second execution mode in response to the EM packet providing the indication of the change from the first execution mode to the second execution mode; and generating a TMX packet comprising an n-bit mode pattern in a packet log, wherein the n is at least two, and wherein the n-bit mode indicates an execution mode status associated with the TMX operation.

14. The non-transitory machine-readable storage medium of claim 13, wherein the execution mode status of the TMX operation is associated with a bit of the n-bit mode pattern, wherein the execution mode status comprises one of an abort of the TMX operation or a commit of the TMX operation.

15. The non-transitory machine-readable storage medium of claim 13, wherein the operations further comprising generating a source transactional memory instruction pointer (STMXIP) packet associated with the TMX packet, wherein in response to the associated TMX packet indicating a change in the execution mode status, the STMXIP packet identifies one of:

a second IP of a last instruction to be executed in a former status;

a third IP of next instruction to be executed in the former status; or a fourth IP of a second instruction to be executed in a changed status, wherein the former status is prior to the changed status.

16. The non-transitory machine-readable storage medium of claim 13, wherein the operations further comprise generating a target transactional memory instruction pointer (TTMXIP) packet associated with the TMX packet, wherein the TTMXIP packet provides a fifth IP of a next instruction to be executed after an abort of the TMX operation.

* * * * *